(12) United States Patent
Beaujon

(10) Patent No.: US 8,256,781 B2
(45) Date of Patent: Sep. 4, 2012

(54) VEHICLE SUSPENSION, STEERING, DAMPING AND ANTI-ROLL SYSTEM WITH LINEAR WHEEL TRAVEL

(76) Inventor: William James Beaujon, Richardson, TX (US)

( * ) Notice: Subject to any disclaimer, the term of this patent is extended or adjusted under 35 U.S.C. 154(b) by 298 days.

(21) Appl. No.: 12/642,811

(22) Filed: Dec. 20, 2009

(65) Prior Publication Data

US 2011/0148066 A1    Jun. 23, 2011

(51) Int. Cl.
    *B60G 3/01*    (2006.01)
(52) U.S. Cl. ................................. 280/124.127
(58) Field of Classification Search ........... 280/124.127, 280/124.13, 124.131, 771, 774, 98
    See application file for complete search history.

(56) References Cited

U.S. PATENT DOCUMENTS

| | | |
|---|---|---|
| 2,368,855 A | 5/1942 | Levy |
| 2,304,291 A | 12/1942 | Wahlberg |
| 2,308,846 A | 1/1943 | White |
| 2,621,002 A | 12/1952 | Pittman |
| 3,565,455 A | 2/1971 | Kostas |
| 3,578,354 A | 5/1971 | Schott |
| 4,342,372 A | 8/1982 | Hayes |
| 4,364,447 A | 12/1982 | Yoshida |
| 5,033,568 A * | 7/1991 | Oda et al. ............... 180/414 |
| 5,060,743 A * | 10/1991 | Oda et al. ............... 180/415 |
| 5,634,653 A | 6/1997 | Browning |
| 5,820,153 A | 10/1998 | Pellerin |
| 6,196,072 B1 * | 3/2001 | Toyohira et al. ......... 73/862.333 |
| 6,357,770 B1 | 3/2002 | Carplaux |
| 7,159,883 B2 | 1/2007 | Mydlarz |

FOREIGN PATENT DOCUMENTS

| | | |
|---|---|---|
| CA | 2608825 A1 | 4/2009 |
| JP | A-10-338009 | 12/1998 |

\* cited by examiner

*Primary Examiner* — Faye M. Fleming

(57) ABSTRACT

A vehicle suspension, steering, damping and anti-roll system for a wheeled vehicle. Unlike most previous vehicle suspension and steering systems, this invention uses a rod-in-sleeve design for the front and rear suspension assemblies to allow vertical linear wheel knuckle movement of the wheels. This invention is unusual by using a cable-operated steering system and also by using cables to transfer cable tension from upward wheel movement to remote spring/shock absorber assemblies. Also unique is the use of a spring/shock absorber assembly arrangement that provides both suspension and anti-roll effects for a pair of right and left wheels in the same unit. The rear suspension proposed shares some similarities to the front suspension and consists of a dual rod-in-sleeve design with cables that transfer forces from road bumps to a remote spring assembly.

6 Claims, 41 Drawing Sheets

Fig. 1 (below)

Fig. 2 (below)

VEHICLE SUSPENSION, STEERING, DAMPING AND ANTI-ROLL SYSTEM WITH LINEAR WHEEL TRAVEL

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

Vehicle suspension and steering system variations for 4 or 3-wheel vehicle designs have been extensively researched and refined. Although many improvements have been made to date, most modem systems continue to be plagued, to some extent, by problems of bump/brake steer, alignment difficulties, inaccurate turning radius angles, alignment changes during road irregularities, anti-roll limitations, lack of adjustability, excessive driver steering strength requirements (often leading to need for power steering), weight, lack of adjustability of suspension rate, lack of adjustability of anti-roll, high unsprung weight and assembly bulkiness. Some of these drawbacks of conventional systems are described below.

Most conventional vehicle steering systems (especially automotive) use a design that includes a tie rod attaching to a pivoting arm to the wheel knuckle and spindle. In a conventional steering system, while the vehicle is driving directly forward, the tie rod is angled 90 degrees from the steering arm pivot and maximal force is transferred from tie rod to steering arm due to this angle. As the vehicle turns (either right or left), the angle between the tie rod and steering arm pivot changes and the efficiency of transfer of force from tie rod to steering arm is diminished due to the change in angles. The end result of this loss in efficiency of transferred forces to the steering arm is an increase in the steering force needed from the driver's steering input (or increased load on the power steering unit).

The (unequal length) double wishbone (or unequal length A-arm) suspension system is considered by many, especially in the racing field, as the gold standard by which other suspension systems are measured. This type of suspension has favorable aspects including overall strength and its ability to control camber during vertical suspension movements. Drawbacks of this type suspension include bump steer (Ackerman angle and steering direction changes during bumps), brake steer (steering angle changes during braking or undesirable steering turning forces transferred to the driver or power steering unit during braking), caster changes during road bumps (causing wandering of the tire/wheel and steering angle changes), toe-in changes during road bumps (causing inaccurate Ackerman angles, steering wander, loss of traction and tire wear).

High unsprung weight is another drawback of most conventional suspension systems. Conventional suspensions often incorporate a spring and shock absorber that rest on an A-arm of the suspension, thus contributing to the unsprung weight of the vehicle. Some (usually rear-engine) racing vehicles minimize unsprung weight by using a pushrod or pullrod to transfer forces from vertical suspension movement to a spring and shock absorber mounted on the sprung portion of the vehicle.

Changing of the springs, and therefore changing of the spring rate, of conventional suspension systems usually requires lifting of the vehicle and wheel removal. This is a cumbersome process which makes fine-tuning or frequent changes of spring rate very inconvenient and time-consuming.

Conventional anti-roll systems often incorporate a torsion (anti-roll) bar that resists the tendency of the vehicle to lean during turns. These anti-roll bars are typically non-adjustable metal bars that pivot on a frame bushing and attach to the A-arms of the suspension. These anti-roll bars contribute to unsprung (and total) suspension weight.

Cylindrical-suspension-component-in-housing (sliding) type suspensions have been designed for aircraft, bicycles, snowmobiles and, to a lesser extent, automobiles and other vehicles. The designs for automotive vehicles have been limited in number and have not been successful thus far. Cylindrical-suspension-component-in-housing designs may have not adequately overcome enough of the limitations of conventional suspension systems (as discussed above) to justify retooling. Other reasons for the lack of success with cylindrical suspension component-in-housing designs may be the new problems encountered with some designs including bulkiness, lack of strength, lack of adequate steerability, inadequate lubrication mechanisms, difficulty integrating anti-roll mechanisms and poor durability.

As discussed above, conventional steering/suspension/anti-roll systems have many limitations which have been a challenge to overcome, even after some attempts at cylindrical-suspension-component-in-housing designs.

BRIEF SUMMARY OF THE INVENTION

This invention is comprised of several components which work together to produce a system for steering, suspending, shock absorbing and anti-roll for a wheeled vehicle. The major components of the dirigible suspension and steering system include a cylindrical suspension component that moves in concert with the wheel hub and spindle, a cylindrical suspension component housing that mounts to a vehicle structural component, a cable-driven steering follower pulley device and a remote energy storage mechanism. The cylindrical suspension component allows for vertically oriented vehicle suspension movement by displacing vertically within its housing in response to road bumps. The cylindrical suspension component also allows for steerability by rotating in the horizontal plane around a vertical axis within its housing during vehicle turns. A unique aspect of this invention is that it allows energy resulting from suspension movement to be transferred to a remote energy storage mechanism via a suspension cable linkage. Another unique aspect of this invention is the use of a cable-driven steering follower pulley device that does not move vertically as the wheel rises during road bumps but instead maintains a fixed vertical relationship to a vehicle structural component, thus reducing bump steer. Another unique aspect of this invention is the use of a remote energy storage mechanism which has anti-roll abilities in addition to suspension and damping abilities, thus negating the need for a separate anti-roll system.

The suspension system for the non-dirigible wheels incorporates a pair of vertical suspension structures which are mounted to a vehicle structural component and act to guide a pair of oscillating vertical suspension structure housings into vertical linear movements. The vertical suspension structure housings are mounted to the wheel hub and oscillate vertically in response to road bumps. A non-dirigible suspension cable linkage transfers displacement of the corresponding wheel hub to a remote energy storage mechanism.

This invention improves on many of the limitations of common suspension designs. Compared to most conventional suspension and steering designs, the proposed suspension system:

1. reduces the tendency of the wheel to change its turning angle, caster or camber during a bump (bump steer) by using a cylindrical-suspension-component-in-housing design to maintain wheel travel in a linear vertical direction, thus maintaining accurate steering angles during wheel travel.

2. allows for more accurate control of steering angles of outside and inside wheels (Ackerman angle) during turns by eliminating the use of a steering arm and using a steering pulley instead.

3. allows more efficient transmission of driver steering input forces from steering wheel to the modified steering knuckle by use of a steering follower pulley device, thus reducing losses of steering forces often encountered in tie rod/pivoting steering arm type suspension during sharp turns.

4. allows for reduced bulkiness of suspension components near the wheel/tire since the energy storage mechanism can be placed remotely. Forces derived from road bumps are transferred via a cable linkage to the remote energy storage mechanism.

5. provides for the possibility of easier adjustment of suspension spring rate and anti-roll by allowing springs, shock absorbers and the anti-roll mechanism to reside in a common location which can be made easily accessible by appropriate vehicle design.

6. allows for increased interior occupant and cargo space since the energy storage mechanism can be mounted in an area that does not limit this interior space.

7. eliminates the need for a separate anti-sway device by integrating the suspension and anti-roll into a distinct working unit (energy storage mechanism).

8. reduces unsprung weight by mounting the energy storage mechanism to the sprung part of the vehicle.

BRIEF DESCRIPTION OF THE SEVERAL VIEWS OF THE DRAWING

Please note: "Wheel-based" refers to components that reside near a (front or rear) wheel of the vehicle as opposed to the components of the energy storage mechanism that may be mounted remotely at various locations within the vehicle.

FIGS. 7, 8 and 9 are non-contiguous drawings with some overlapping of areas.

FIG. 8 is a close-up (magnified) exploded view of the middle portion of the right front wheel-based suspension assembly.

FIG. 9 is a close-up (magnified) exploded view of the lower portion of the right front wheel-based suspension assembly.

FIG. 25 and FIG. 26 are non-contiguous views with some overlap of areas.

FIG. 26 is a close-up (magnified) exploded view of the lower portion of the energy storage mechanism.

Note the cylindrical suspension component housing situated on the upper end of the cylindrical suspension component in this scenario.

Figure 36:
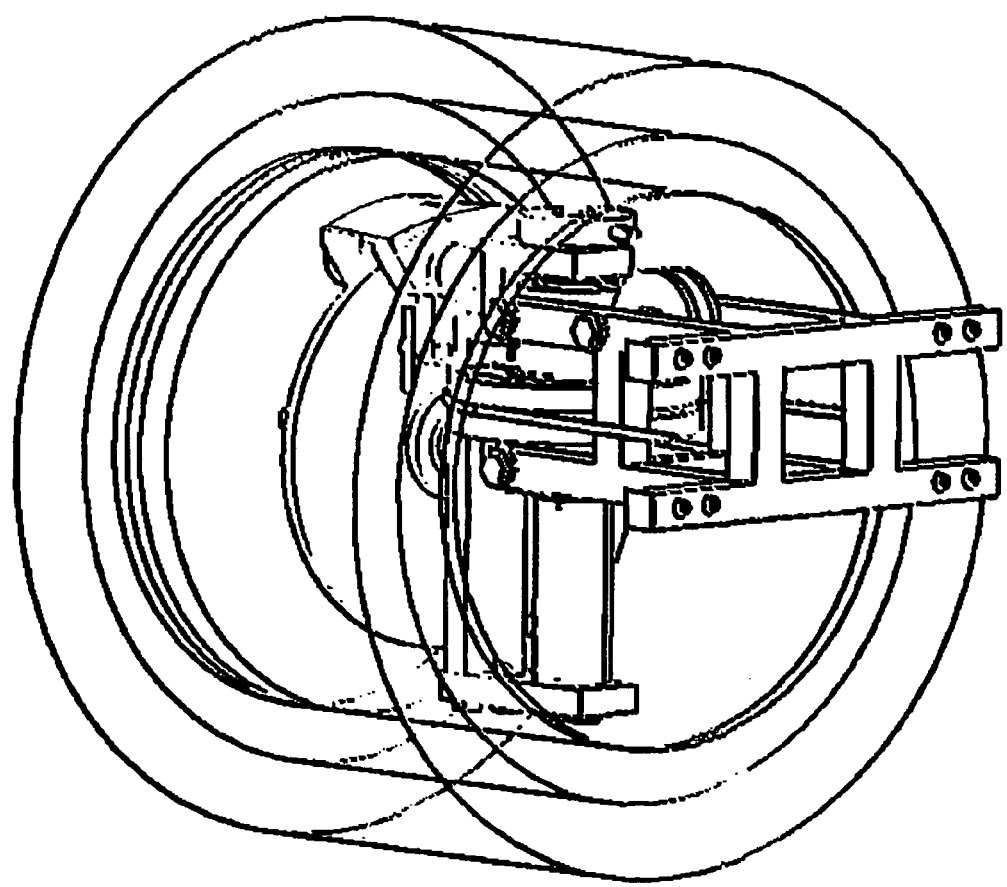

FIG. 36 is a medial view of the right front wheel-based suspension system under full-load situation (during road bump, compressed). Note the cylindrical suspension component housing situated on the lower end of the cylindrical suspension component in this scenario.

Figure 37:
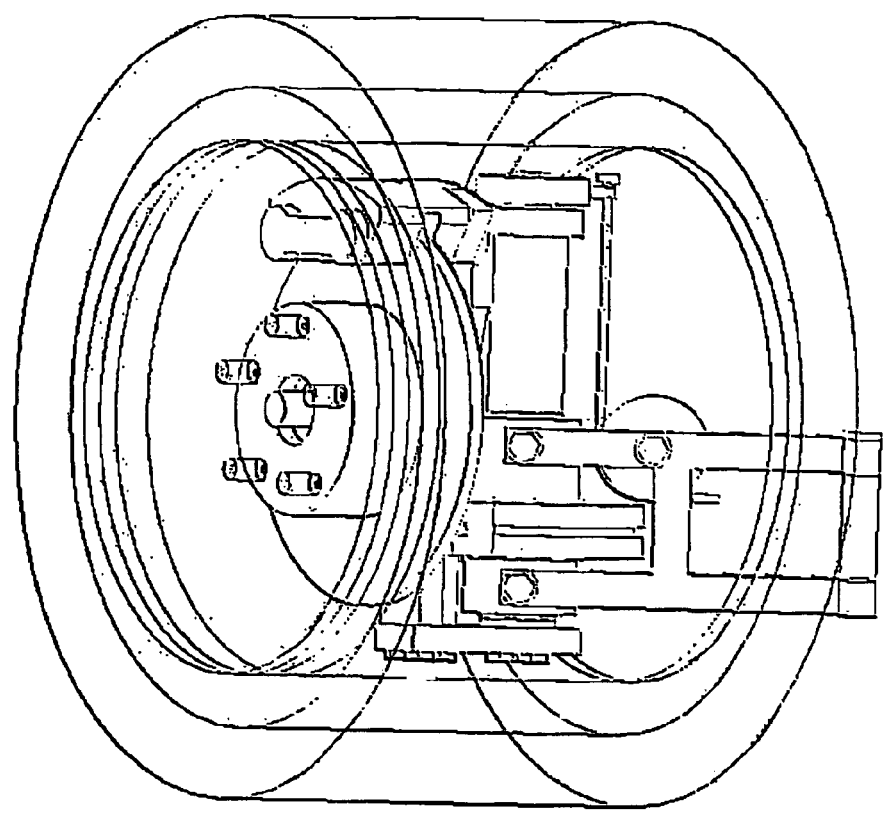

FIG. 37 is a perspective view of the right front wheel-based suspension system during a sharp left turn. The subframe is shown but the vehicle structural component (frame) is not shown in this picture.

Figure 38:
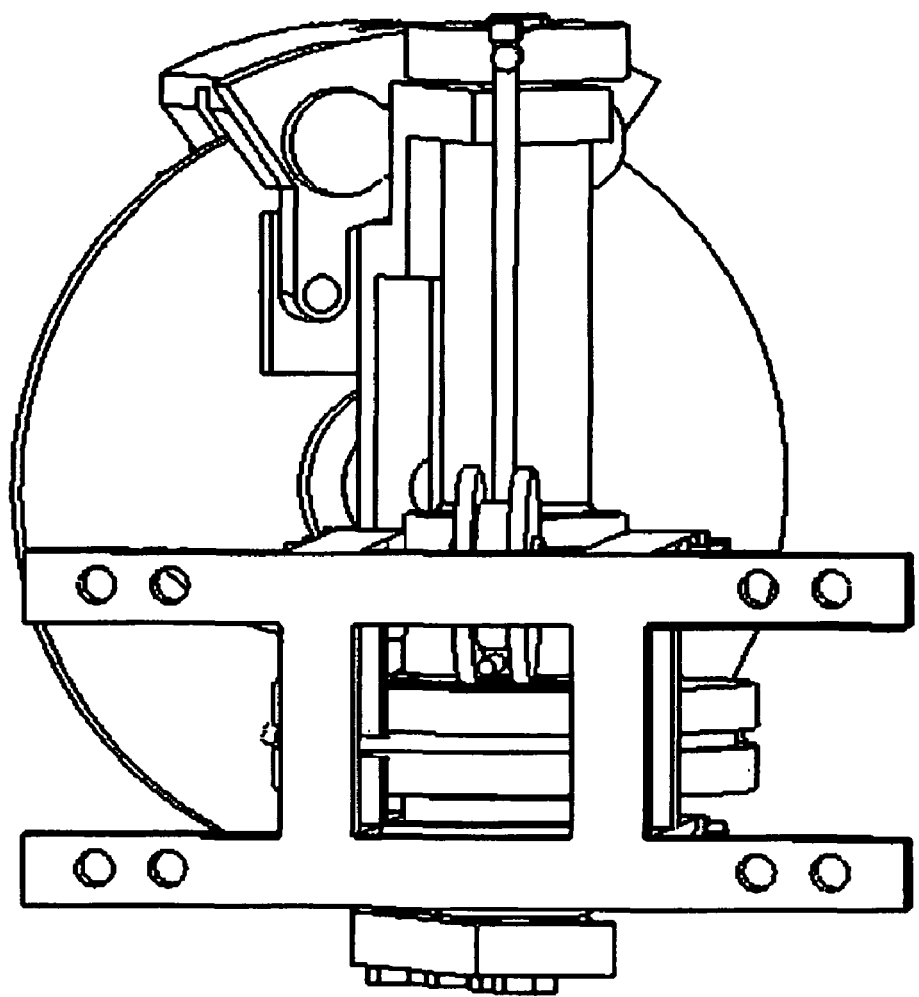

FIG. 38 is a medial view of the right front wheel-based suspension system during sharp left turn. Please note that steering angle is limited in this configuration due to large rim width and large positive rim offset whereby medial rim surface comes in close proximity to steering cable linkage route. Smaller rim width or smaller rim offset will allow larger degrees of turning angle.

Figure 39:
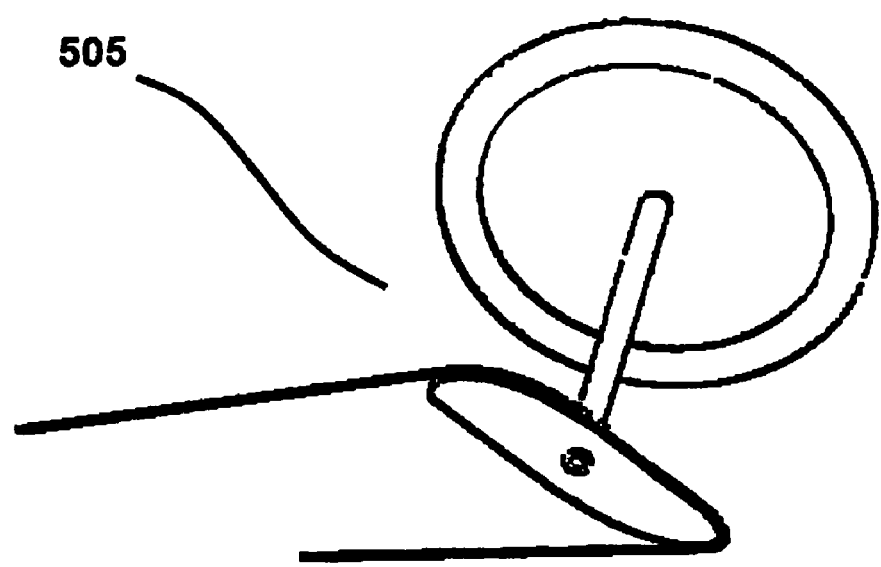

FIG. 39 is a perspective view of a modified steering wheel driving pulley mechanism (505) that has incorporated a cam which titrates steering cable linkage displacement in order to maintain proper toe-in during turns.

Figure 40:
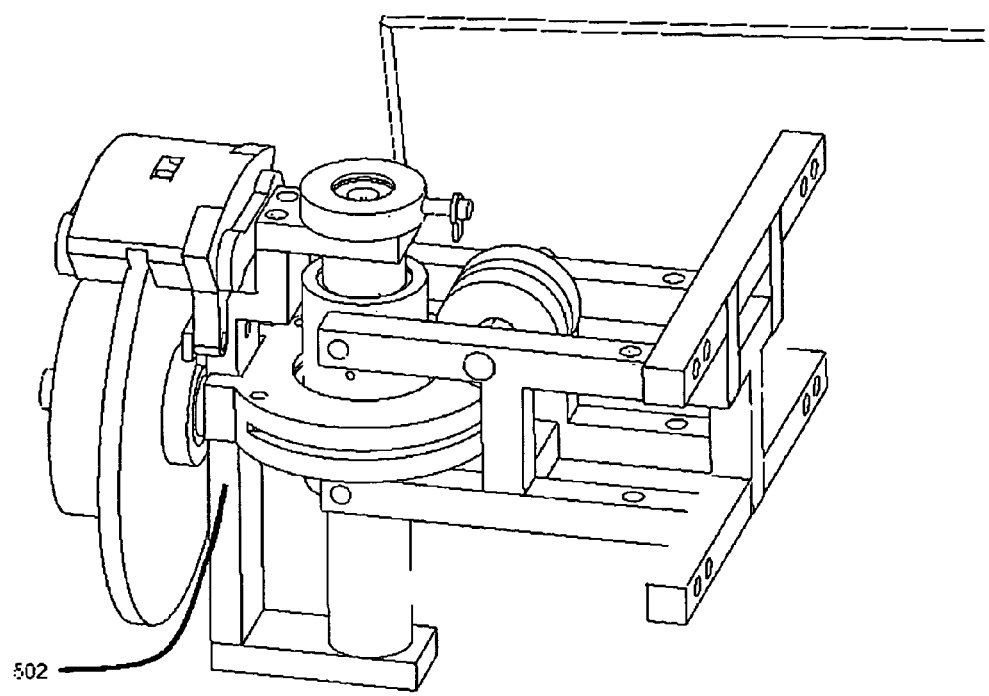

FIG. 40 shows a right front wheel-based suspension system that is designed to incorporate a lubricating block of PTFE or nylon on the anterior and posterior vertical surfaces of the modified steering knuckle (as opposed to using a steering follower pulley device secondary bore as a contact surface to make contact with a modified steering knuckle surface).

Figure 41:
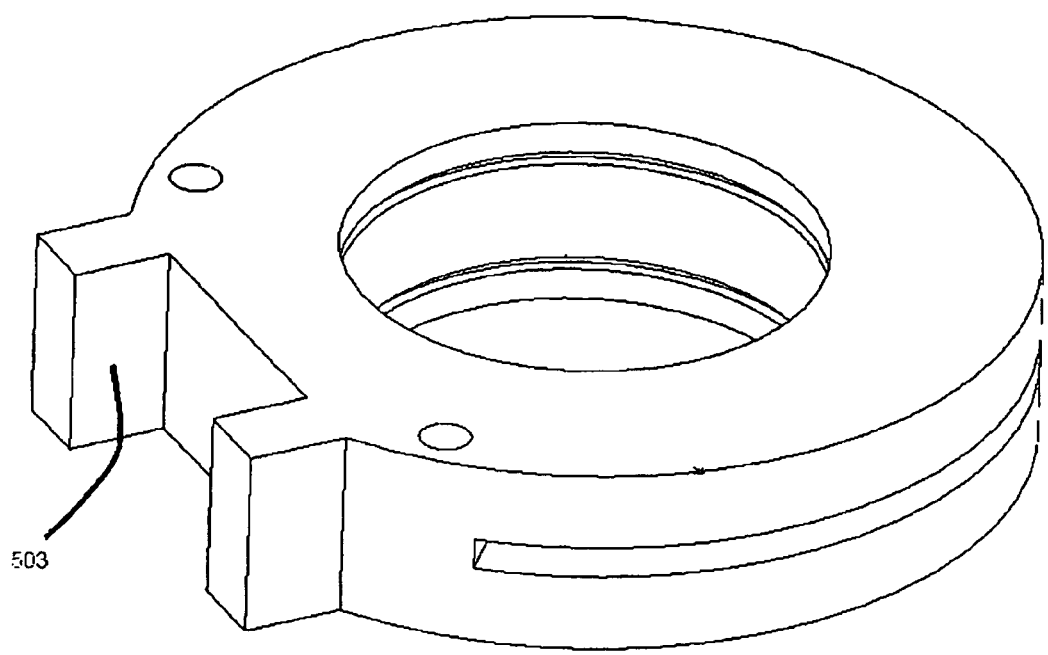

FIG. 41 shows a steering follower pulley device designed to incorporate a contact surface for a lubricating block of PTFE or nylon that glides on the vertical surface of the modified steering knuckle.

DETAILED DESCRIPTION OF THE INVENTION

Figure 1:
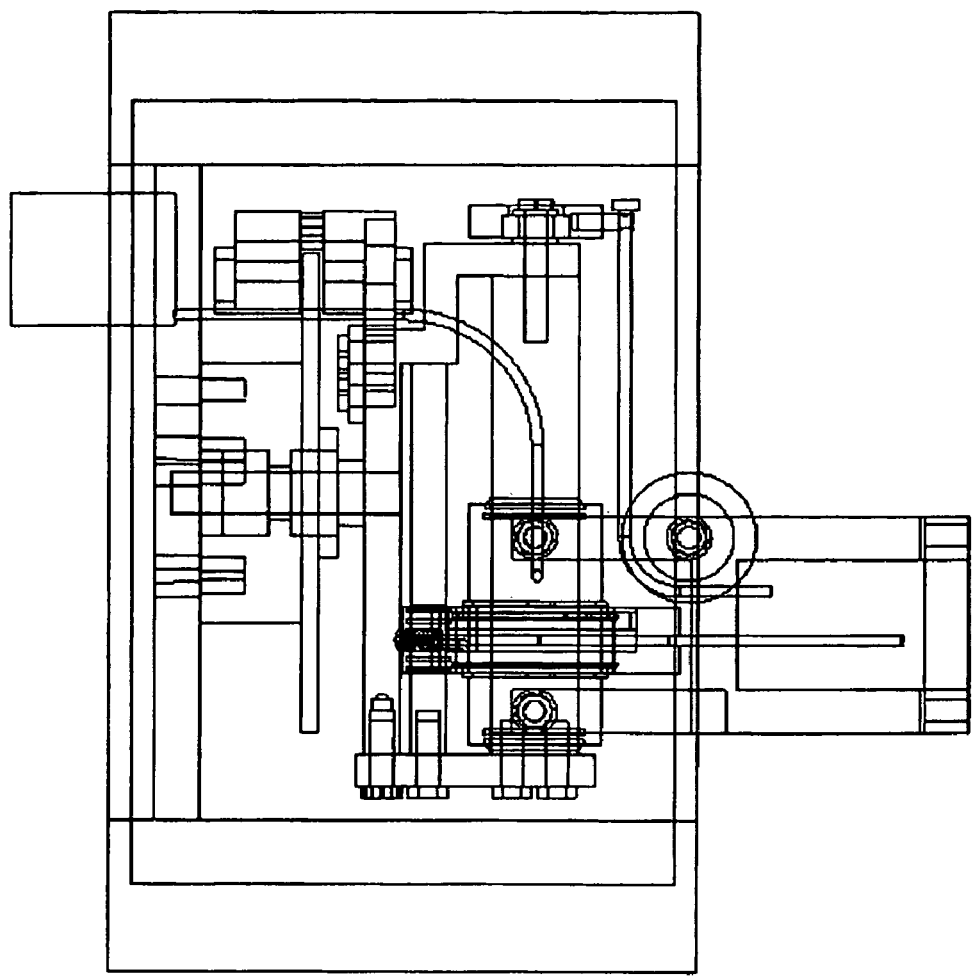
FIG. 1 is a frontal view of the right front wheel-based suspension assembly with a translucent wheel/tire shown for reference.
Figure 2:
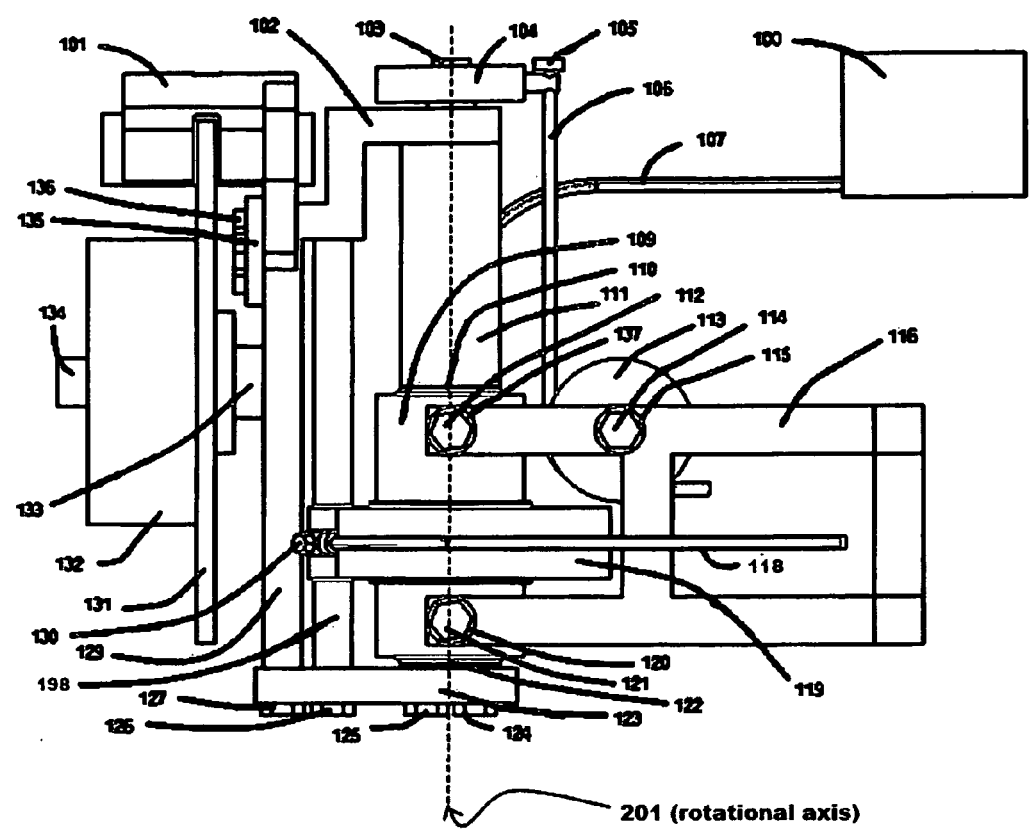
FIG. 2 is a frontal view of the right front wheel-based suspension assembly.
Figure 3:
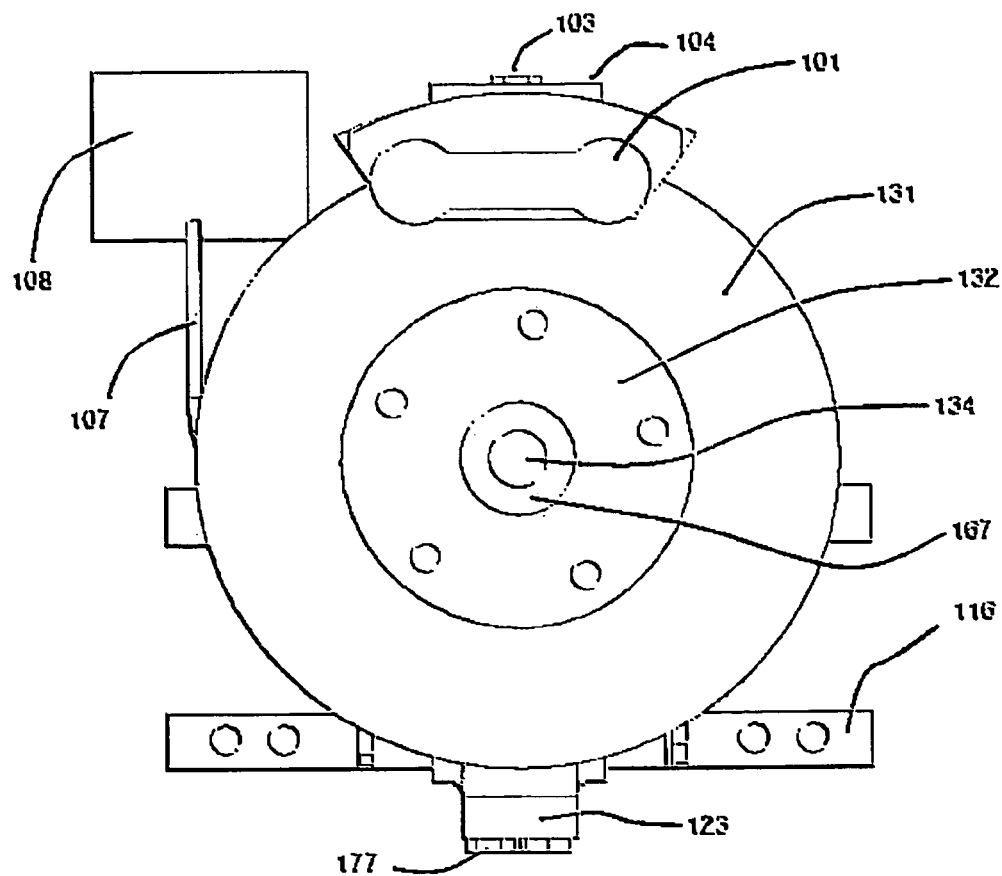
FIG. 3 is a lateral (viewing from right side of vehicle) view of the right front wheel-based suspension assembly.
Figure 4:
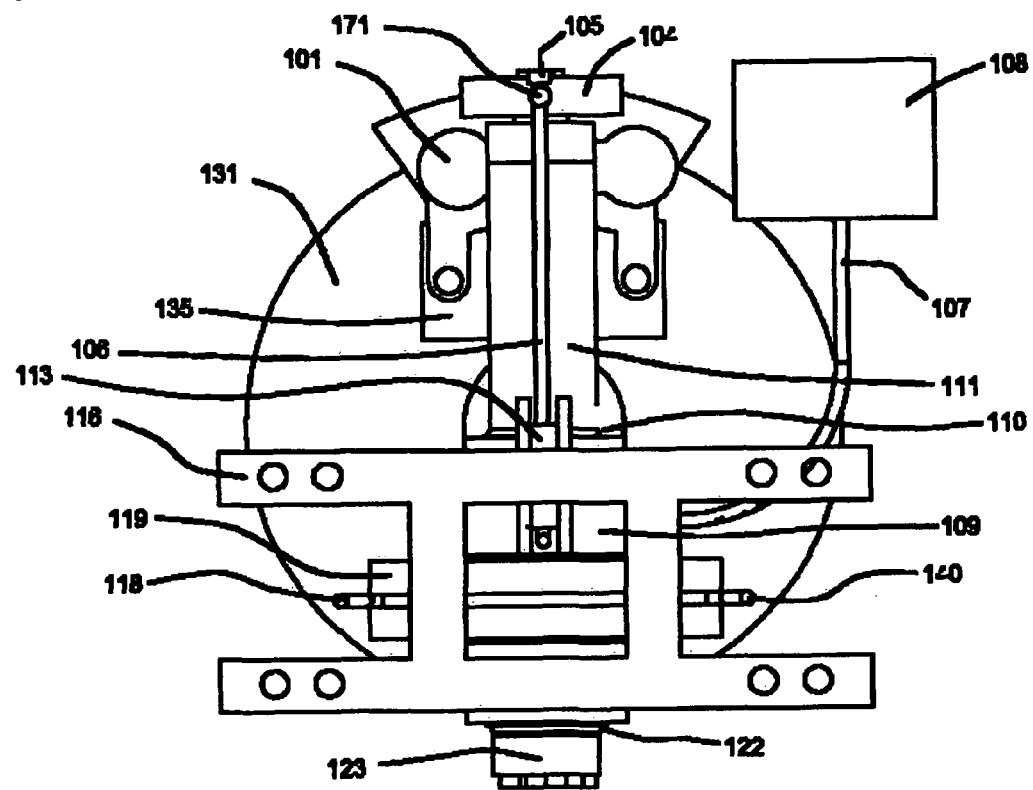
FIG. 4 is a medial view of the right front wheel-based suspension assembly.
Figure 5:
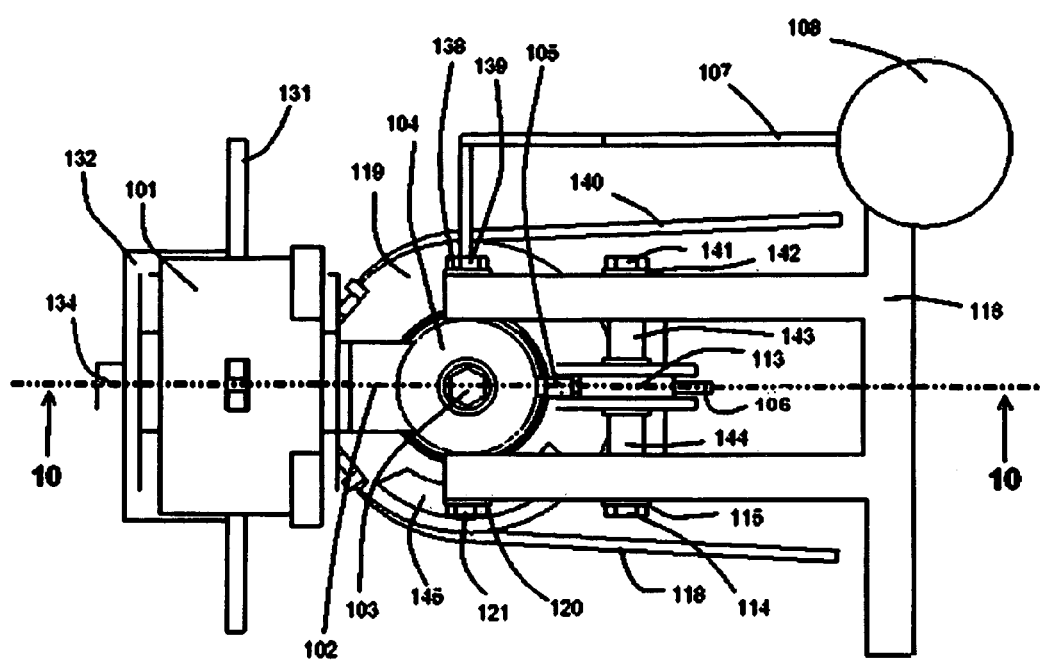
FIG. 5 is top view of the right front wheel-based suspension assembly. Section line for FIG. 10 is shown.
Figure 6:
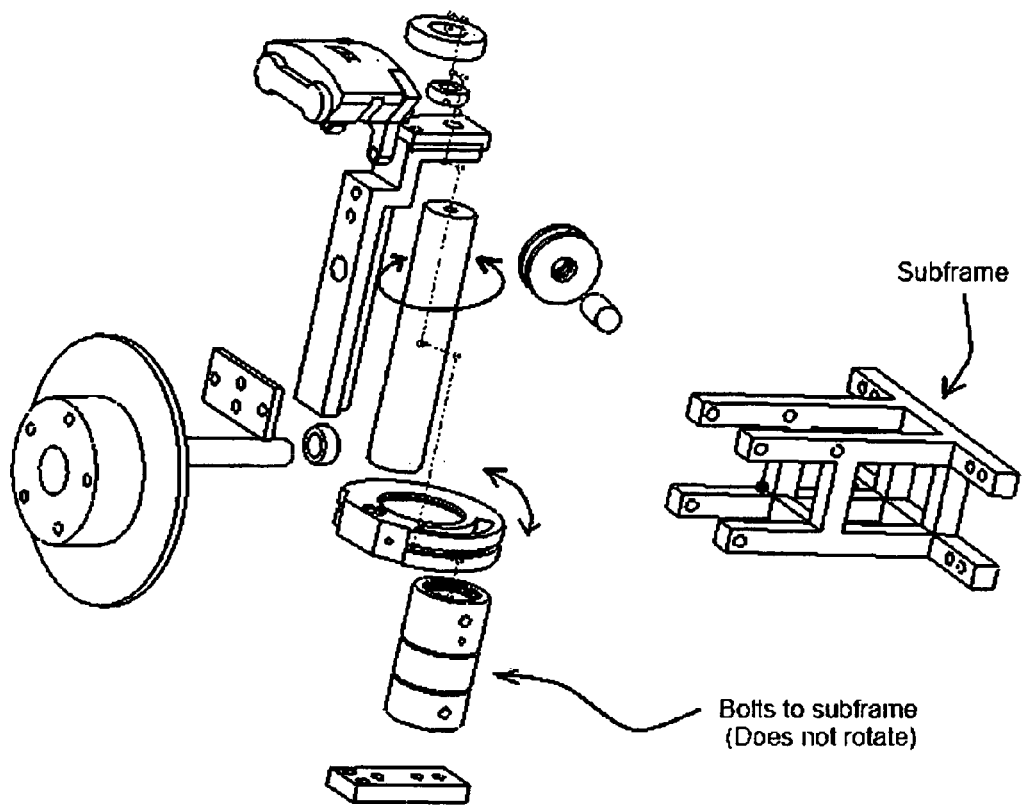
FIG. 6 is an exploded view of the right front wheel-based suspension assembly.
Figure 23:
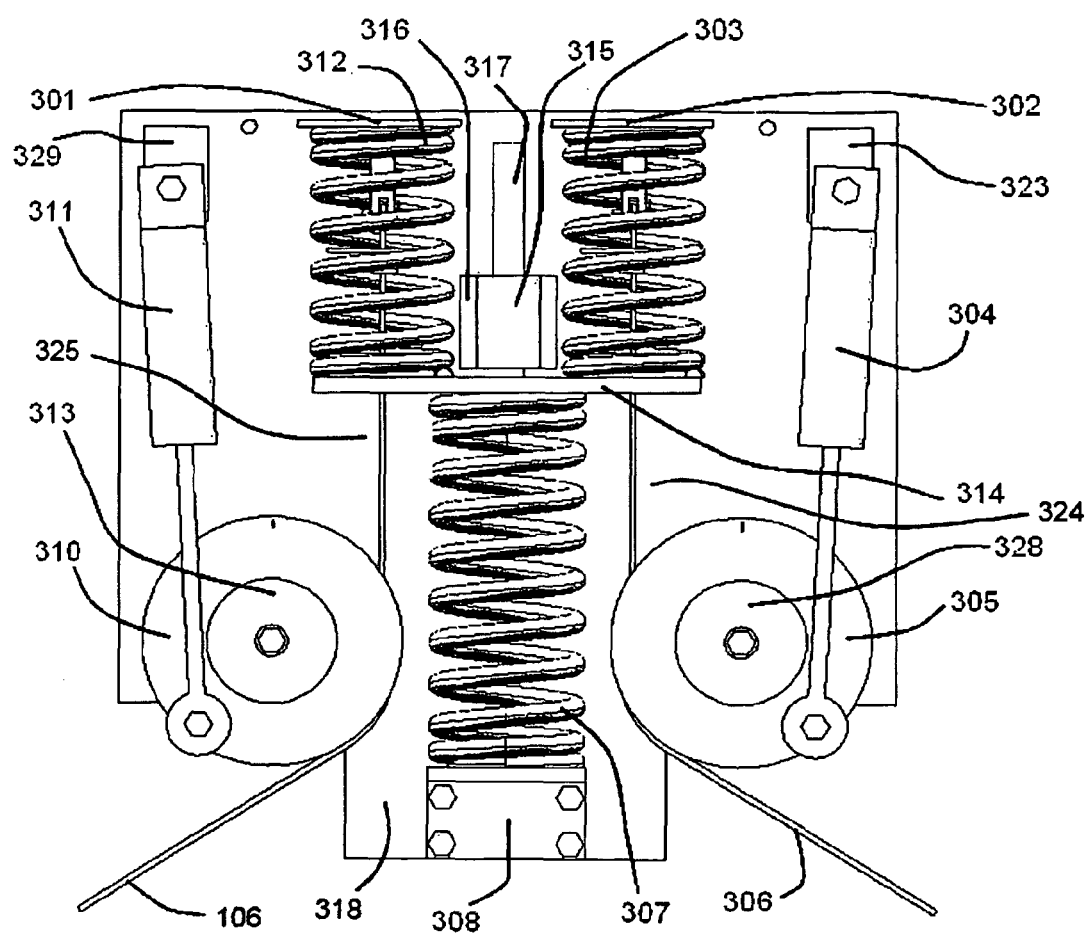
FIG. 23 is a frontal view of the energy storage mechanism.
Figure 24:
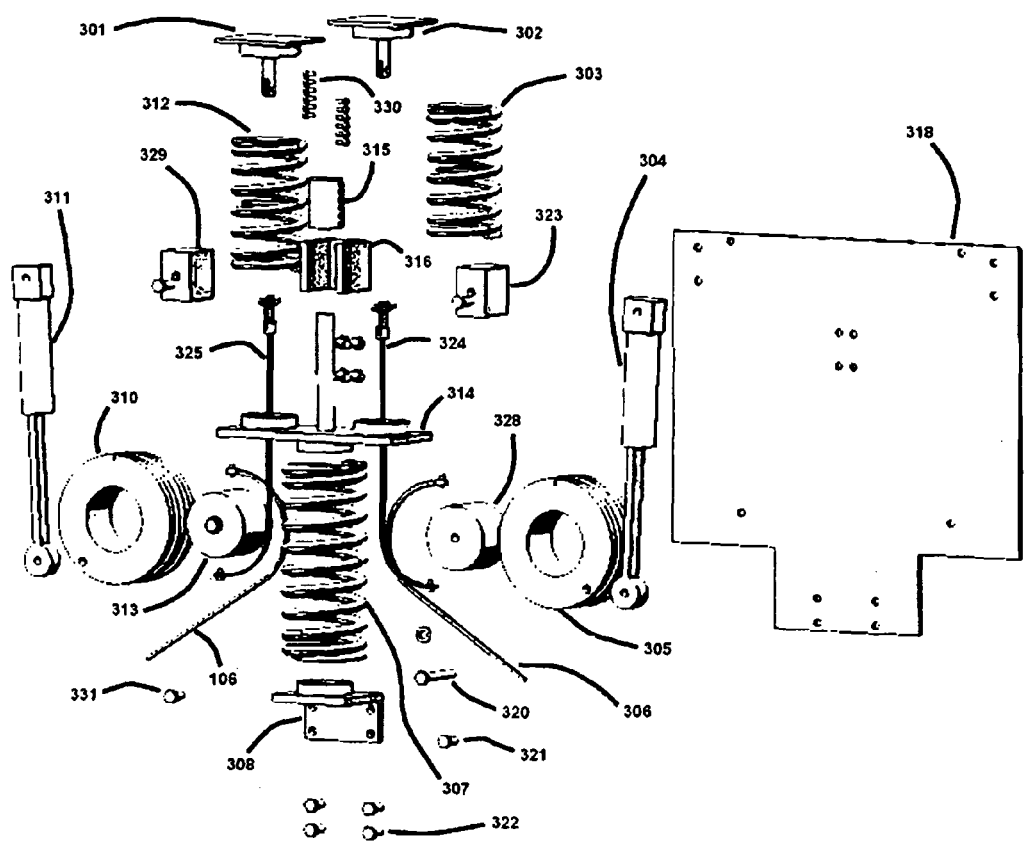
FIG. 24 is an exploded view of the remote energy storage mechanism.
Figure 25:
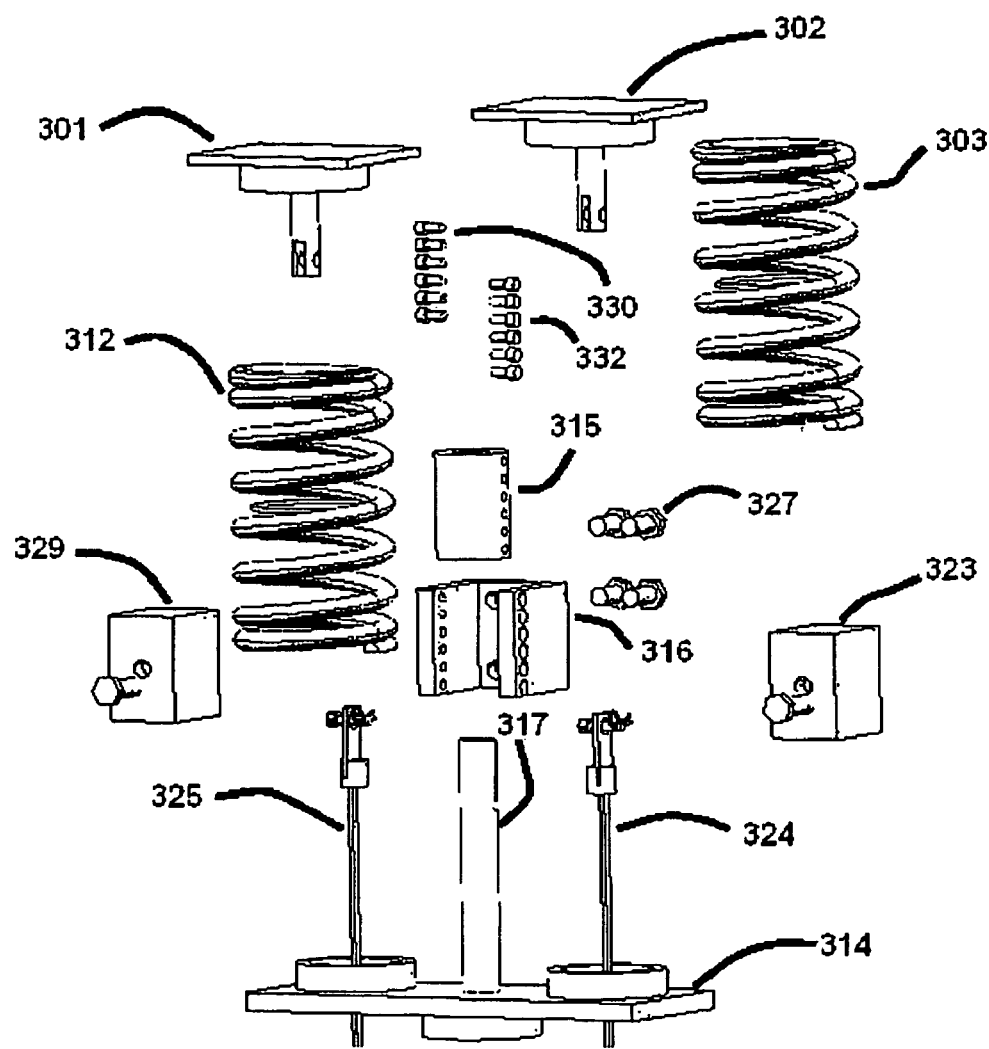
FIG. 25 is a close-up (magnified) exploded view of the upper portion of the energy storage mechanism.
Figure 26:
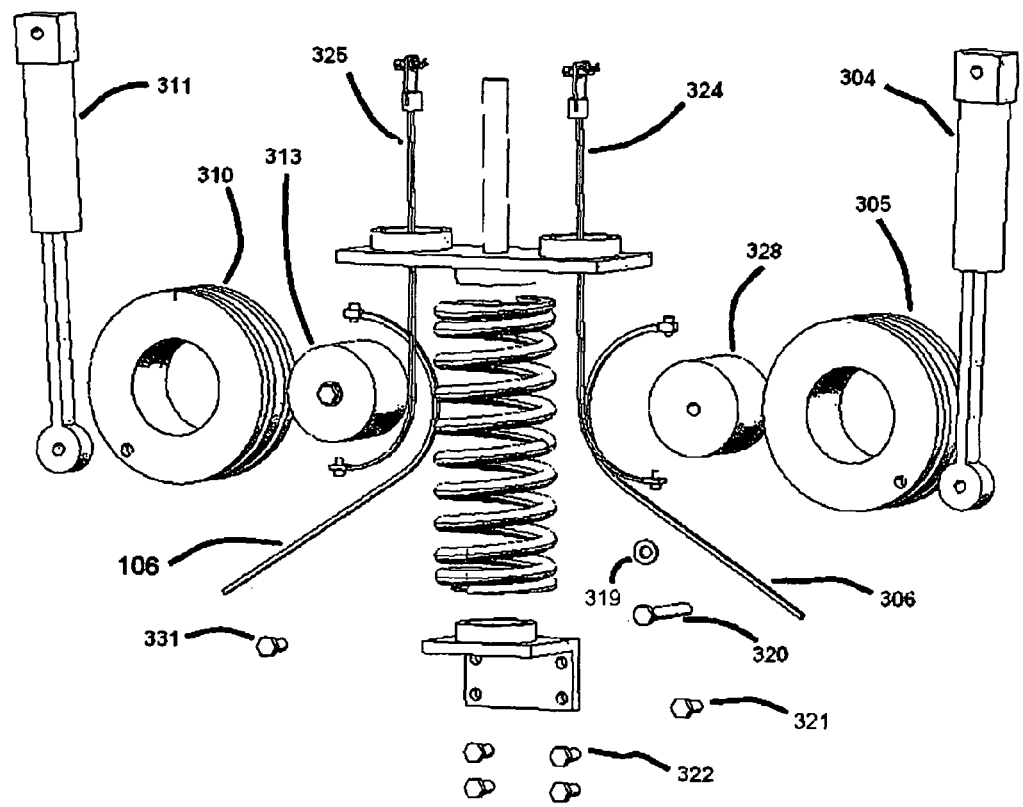
Figure 31:
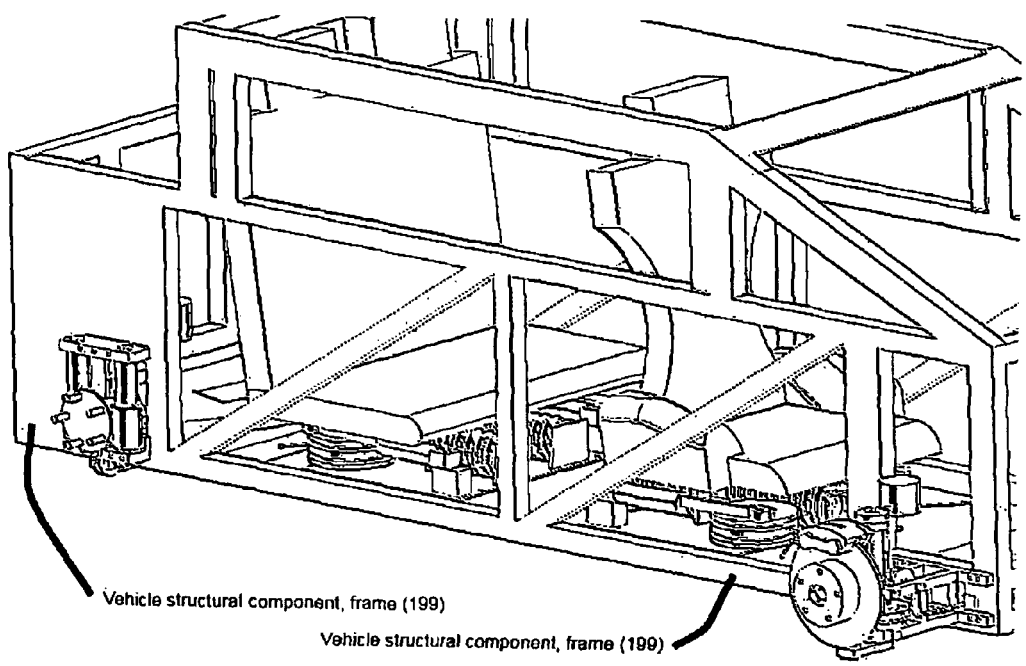
FIG. 31 is a perspective view showing examples of possible mounting locations of the energy storage mechanisms.
Figure 32:
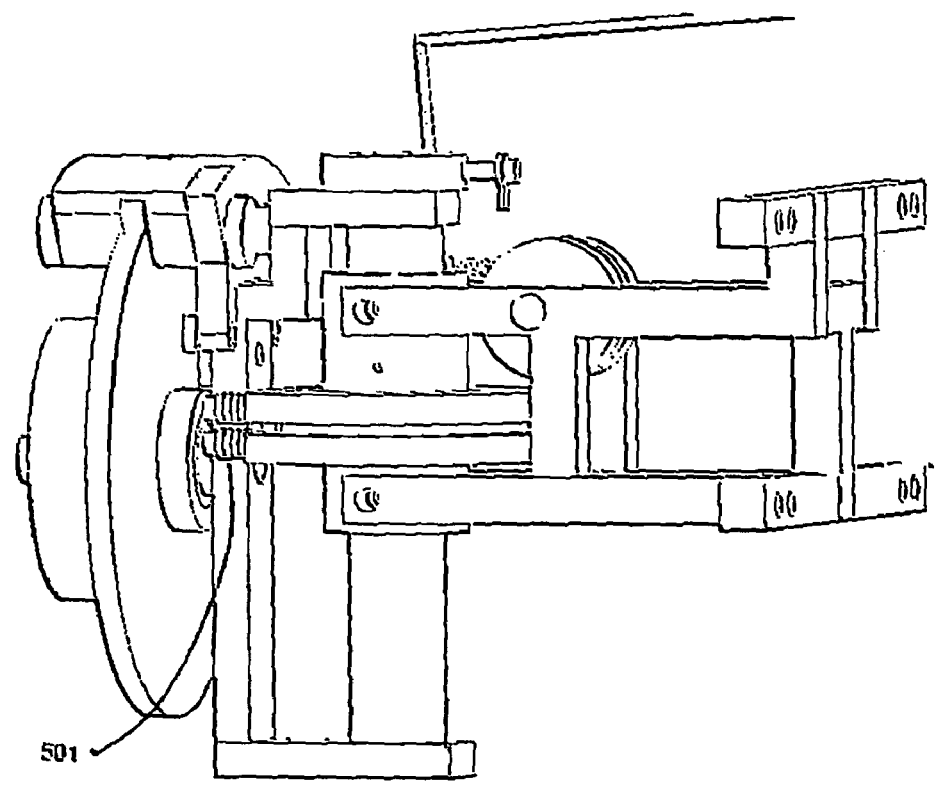
FIG. 32 is a perspective view of the right front wheel-based suspension system which incorporates small wheels mounted on the steering follower pulley device to apply pressure to the modified steering knuckle (instead of using a secondary bore of the steering follower pulley device to apply forces to a secondary rod of the modified steering knuckle).
Figure 33:
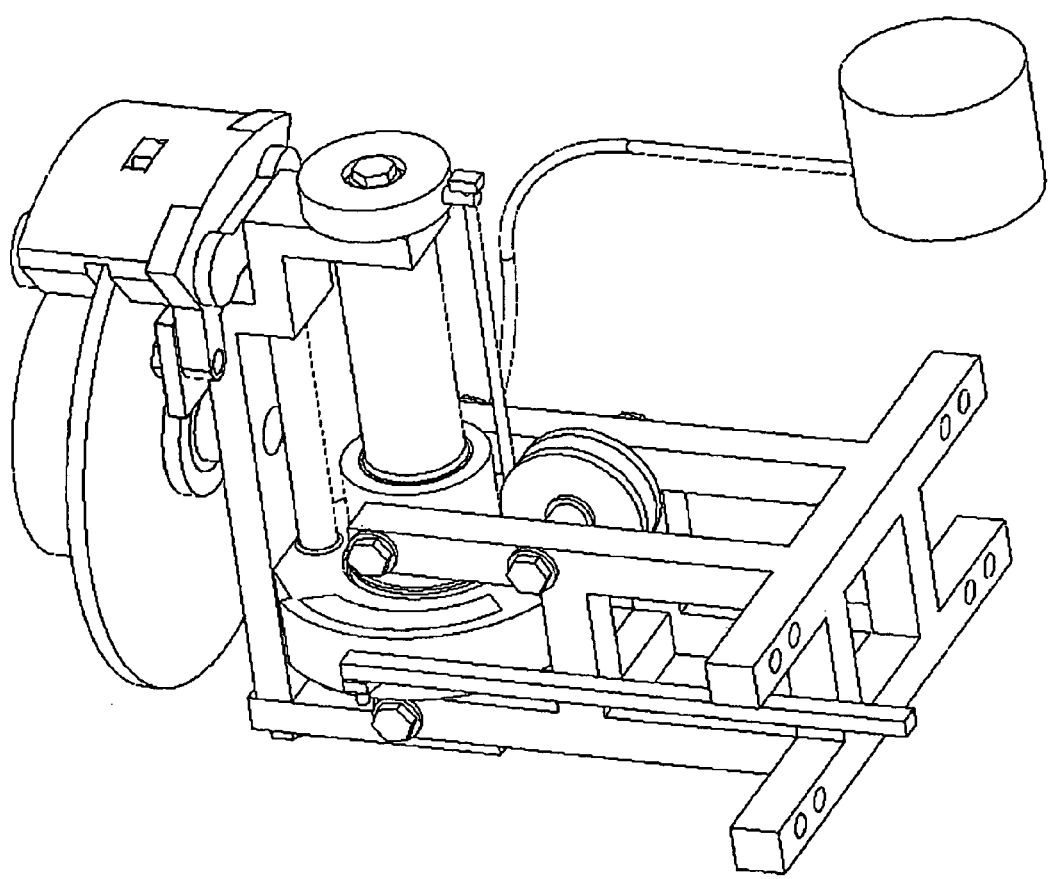
FIG. 33 is a perspective view of the right front wheel-based suspension system which incorporates a steering-rod type linkage to the steering follower pulley device instead of a cable system.

This invention is best described by dividing it into the front wheel-based components shown in FIG. 2 and further detailed by FIGS. 3 to 17, the rear wheel-based components shown in FIGS. 19 to 22, and the energy storage mechanism shown in FIG. 23 and further detailed in FIGS. 24 to 27. Please note FIG. 31 which shows that the vehicle structural component (199) is the frame of the vehicle in these examples and exhibits an external surface which is used in mounting components thereto.

Referring to the front-wheel-based components in FIG. 2, a cylindrical suspension component housing (109) is firmly mounted to the subframe (116). The subframe (116) is designed to be firmly mounted to a vehicle structural component (199). The inner cylindrical surface of the cylindrical suspension component housing (109) acts as a guiding sleeve to the cylindrical suspension component (111), allowing for vertical movements of the cylindrical suspension component (111) during road bumps and allowing for rotational movements of the cylindrical suspension component (111) around the common long axis of the cylindrical suspension component (111) and the cylindrical suspension component housing (109) during vehicle turns. The steering follower pulley device (119) rotates in the horizontal plane around the outer surface of the cylindrical suspension component housing (109) in response to tension in the steering cable linkage (118). During vehicle turns, the steering follower pulley device (119) rotates around the cylindrical suspension component housing (109) and makes contact with the modified steering knuckle steering surface (198), thus initiating rotation of the modified steering knuckle (102) around the common axes of the cylindrical suspension component (111), steering follower pulley device (119) and the cylindrical suspension component housing (109). The modified steering knuckle (102) [including wheel spindle (133)], hub (134), wheel, steering follower pulley device (119) and cylindrical suspension component (111) all rotate around the long vertical axis of the cylindrical suspension component (111) in response to steering input applied thereto by the steering wheel driving pulley mechanism (504). Tension in the suspension cable linkage (106) maintains alignment of the suspension cable linkage (106) within the groove of the pulley (113), and a bearing (described later in other views) allows the bearing cap (104) to avoid rotation despite rotation of the modified steering knuckle (102) and cylindrical suspension component (111) during vehicle turns. As the vehicle encounters road bumps, vertical displacement of the cylindrical suspension component (111) and modified steering knuckle (102) cause vertical displacement of the bearing cap (104) and thus increased tension in the suspension cable linkage (106). Tension and displacement of the suspension cable linkage is ultimately transferred to the energy storage mechanism (described later in other views).

Figure 7:
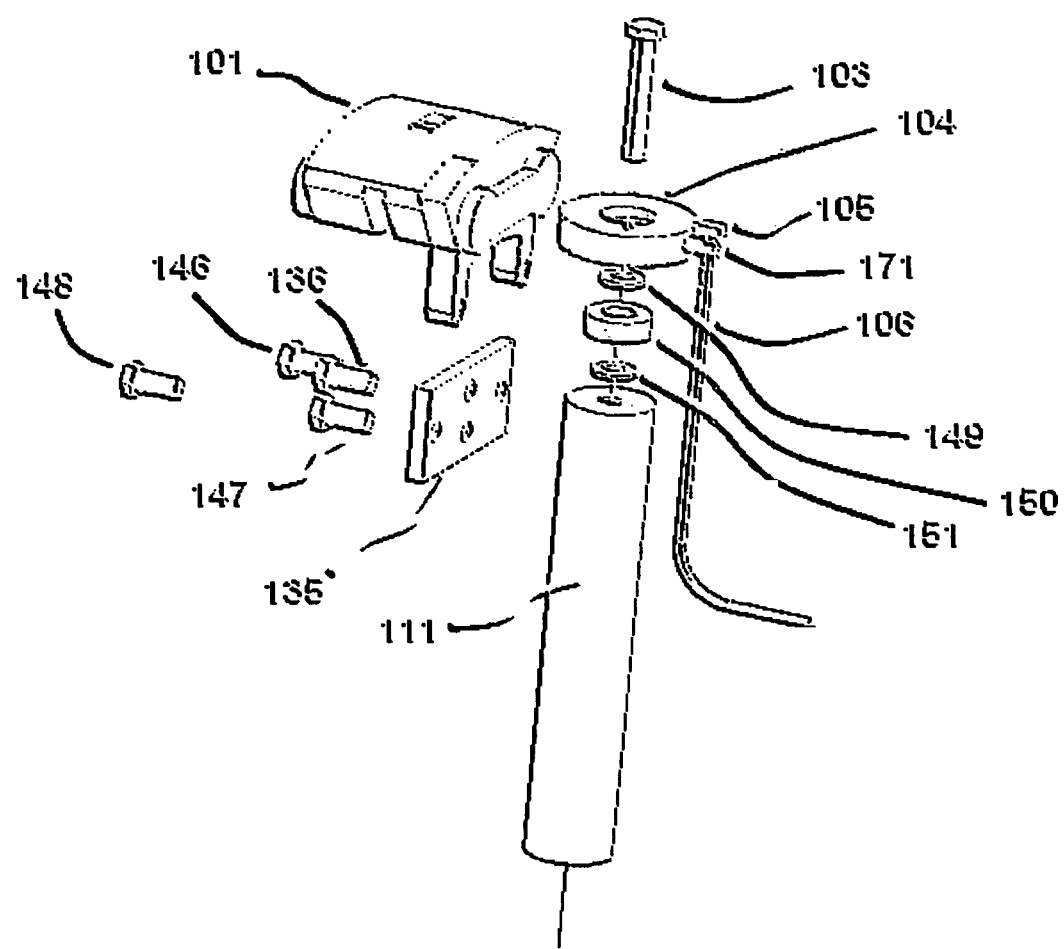
FIG. 7 is a close-up (magnified) exploded view of the upper portion of the right front wheel-based suspension assembly.
Figure 8:
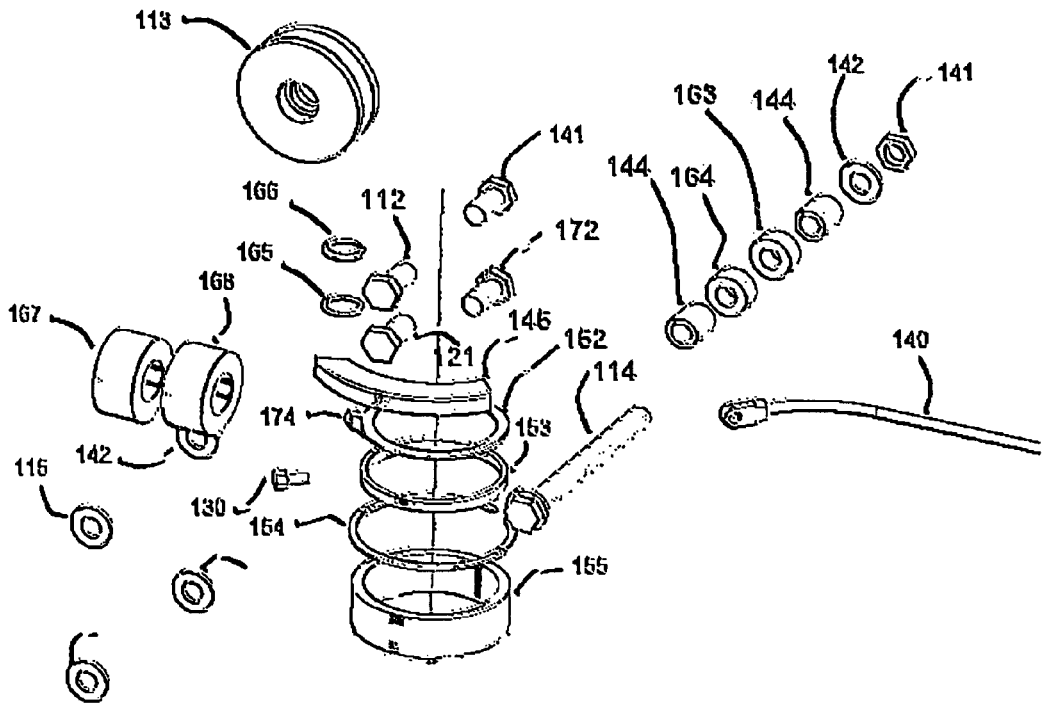
Figure 9:
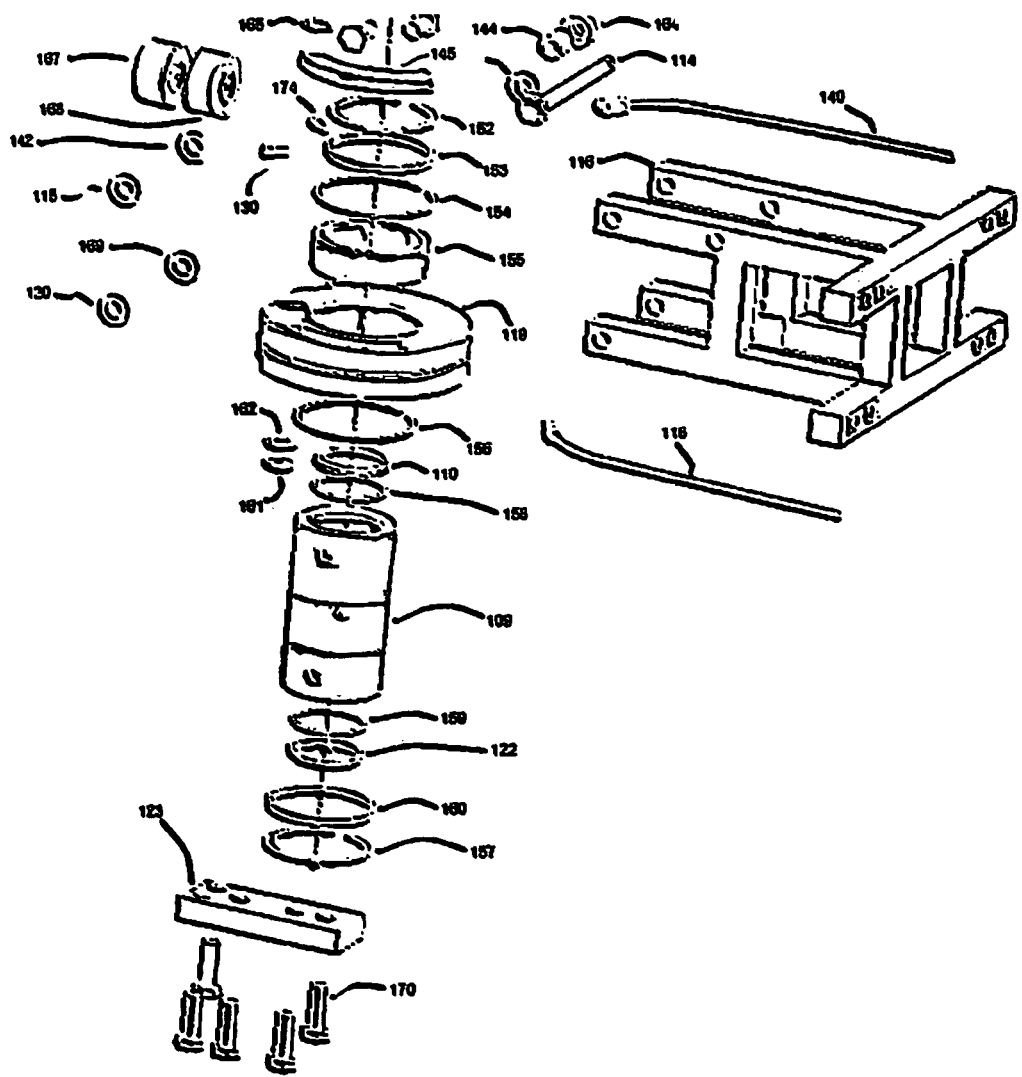
Figure 10:
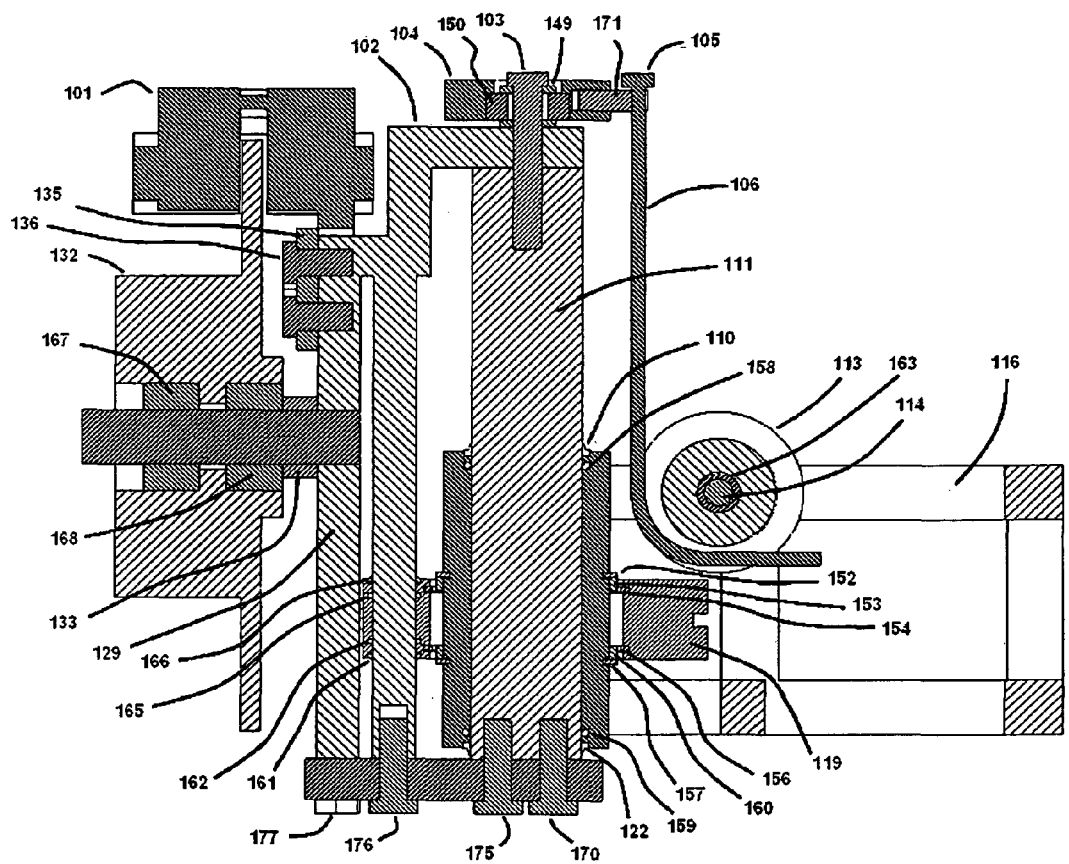
FIG. 10 is a front sectional view of the right front wheel-based suspension assembly with steering cable linkage and oil reservoir/tubing removed.
Figure 11:
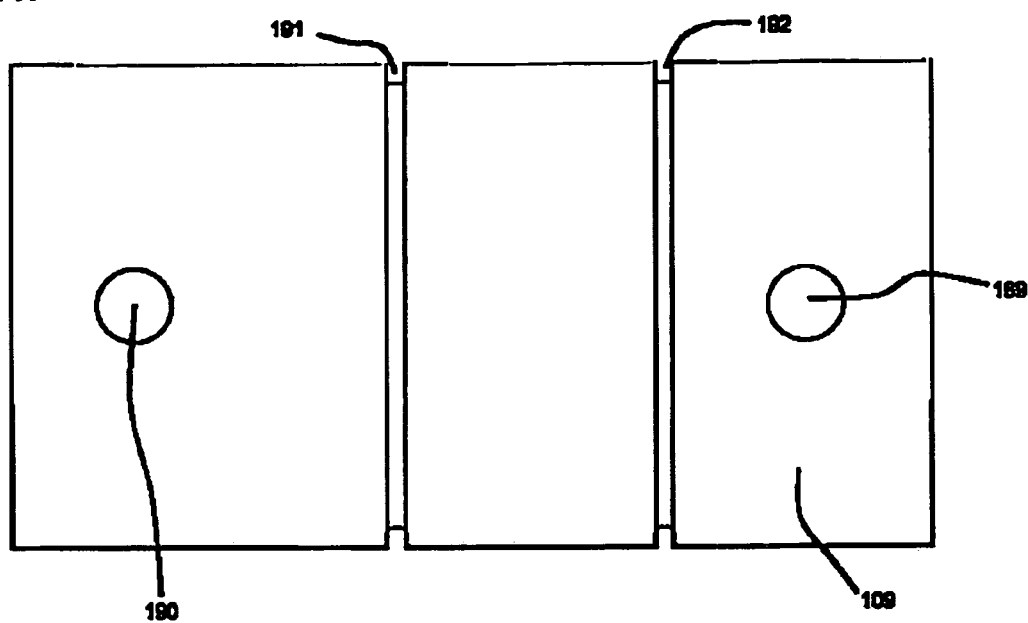
FIG. 11 is a frontal view of the cylindrical suspension component housing.
Figure 12:
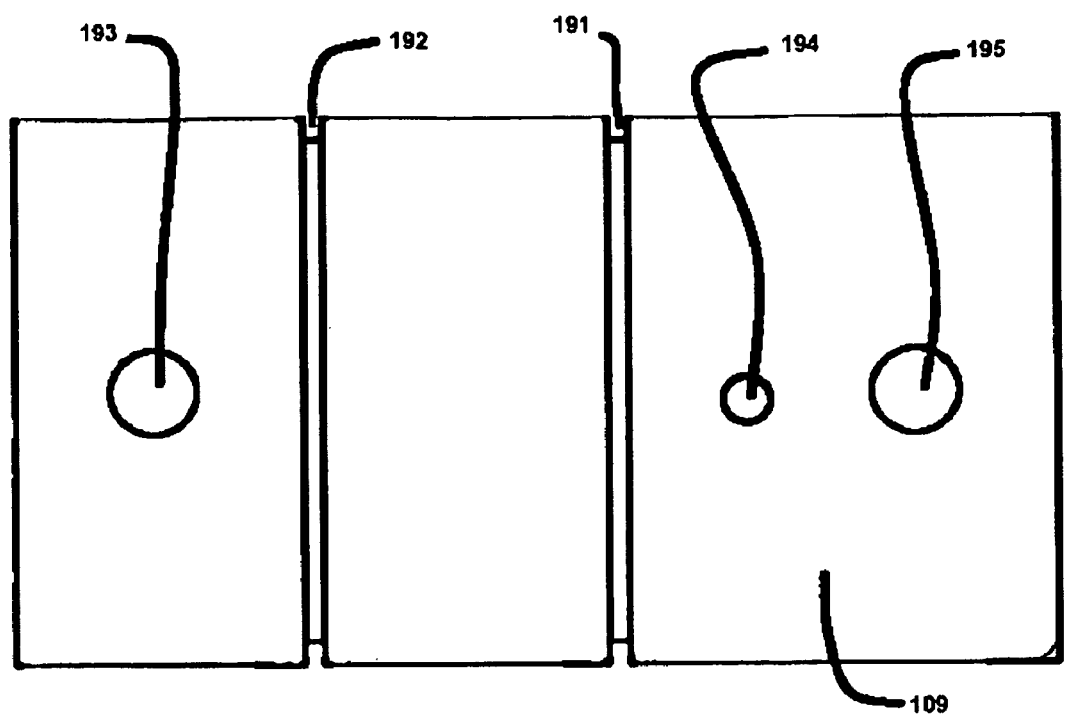
FIG. 12 is a posterior view of the cylindrical suspension component housing.
Figure 13:
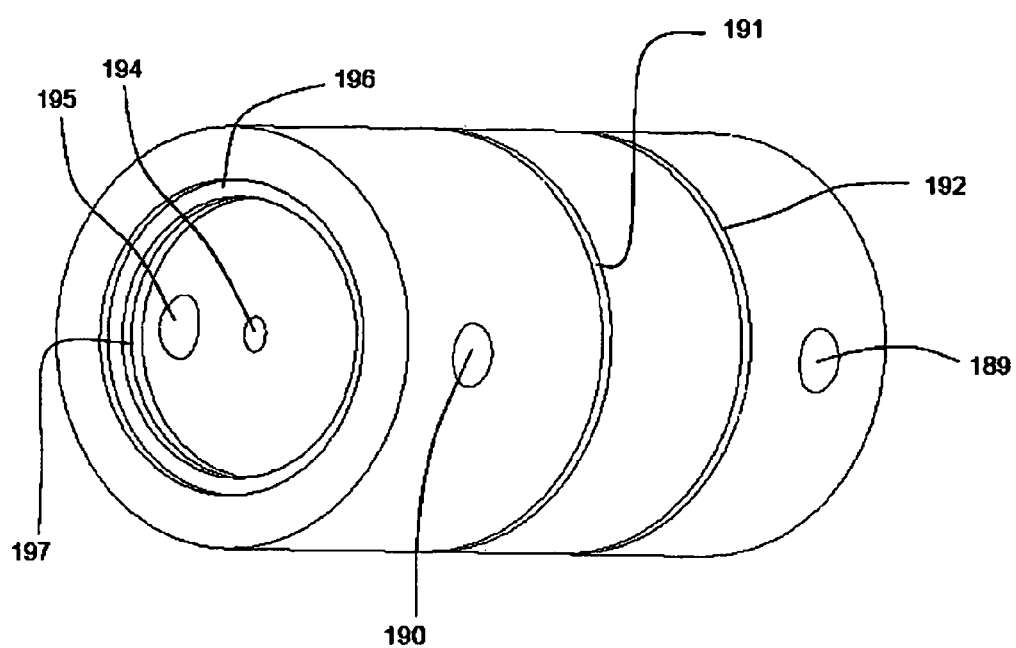
FIG. 13 is a perspective view of the cylindrical suspension component housing.

Referring to FIG. 7, the suspension cable attachment mechanism consists of a bearing cap (104), bearing (150), washers (149 and 151) and cable attachment pin (171). Although the cylindrical suspension component (111) and modified steering knuckle rotate during turns, the bearing (150) prevents transmission of this rotation to the bearing cap (104), thus allowing the suspension cable linkage (106) to maintain proper alignment with the pulley (113) during vehicle turns.

Figure 14:
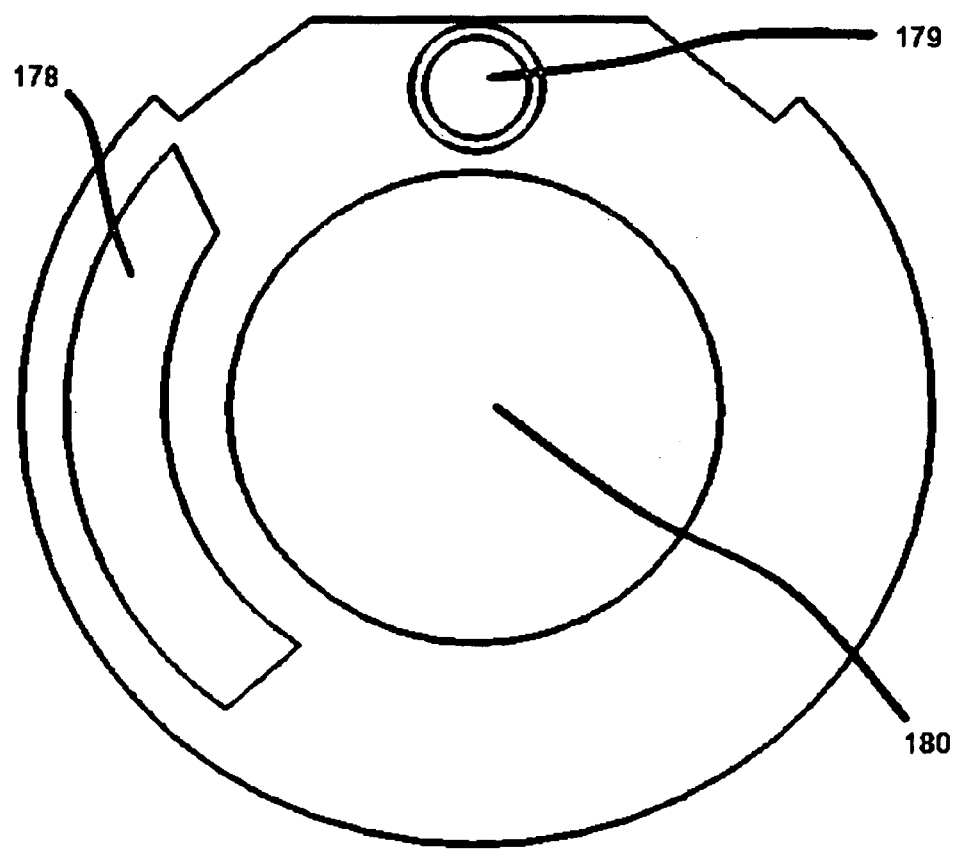
FIG. 14 is a top view of the steering follower pulley device.
Figure 15:
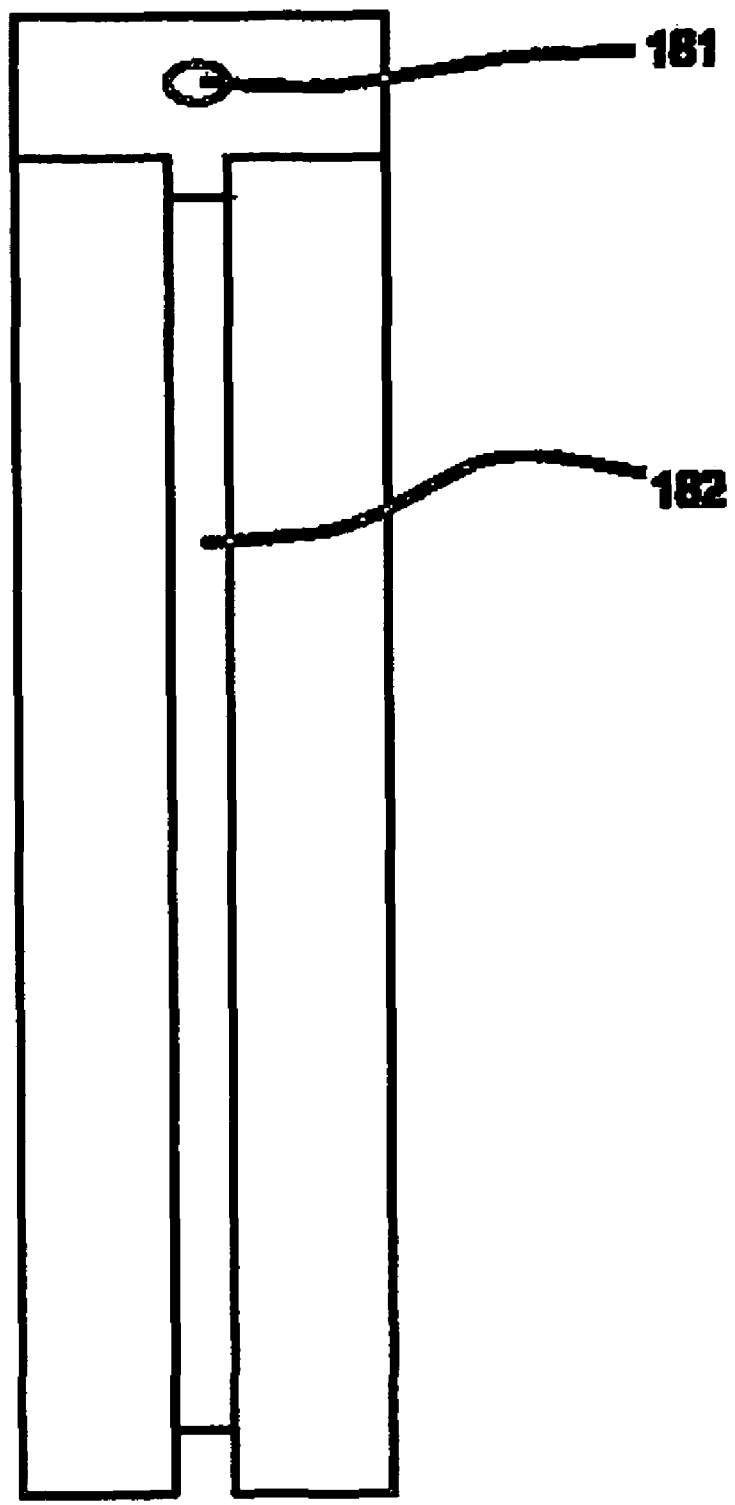
FIG. 15 is a frontal view of the steering follower pulley device.
Figure 16:
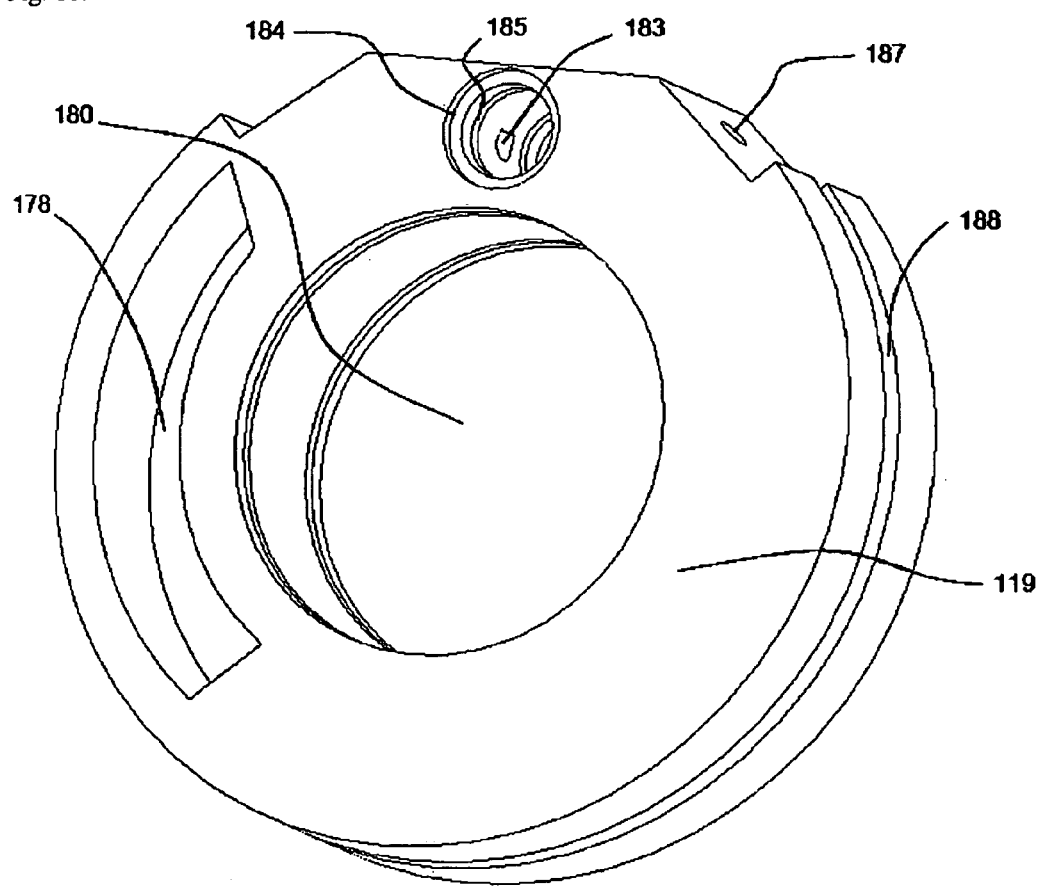
FIG. 16 and FIG. 17 are perspective views of the steering follower pulley device.
Figure 17:
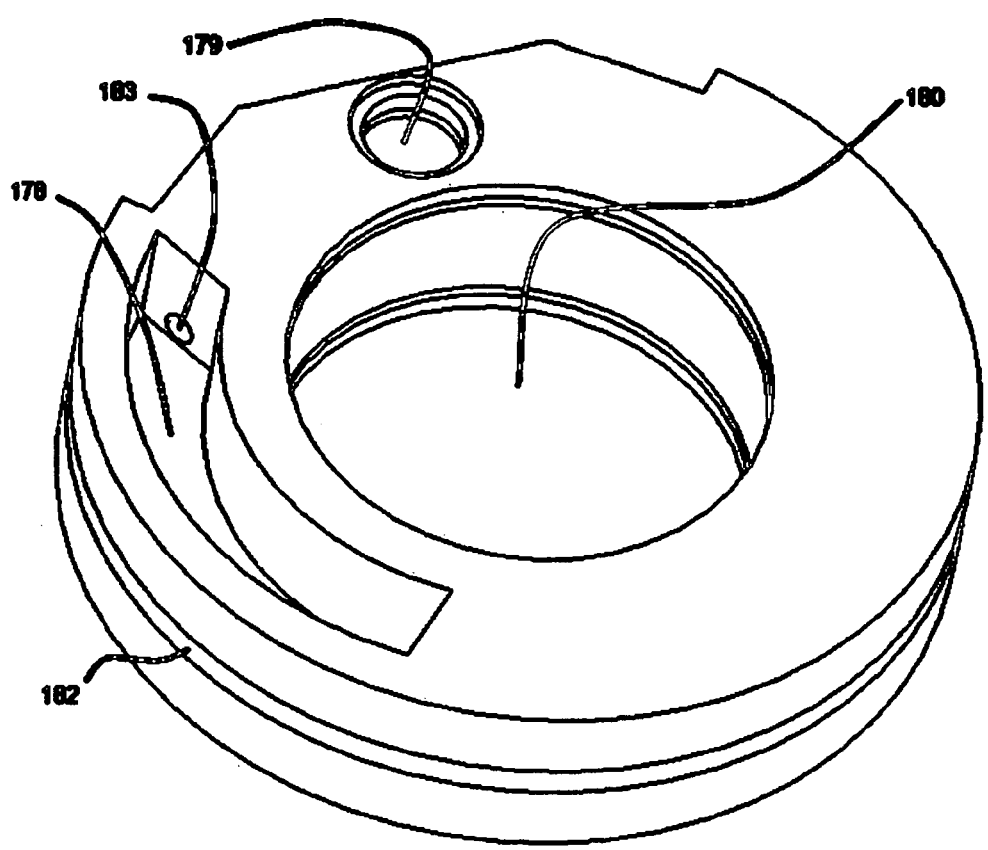

Referring to FIG. 14 in the preferred embodiment, the cylindrical secondary bore (170) of the steering pulley acts as a (lubricated) contact surface which is used to apply pressure to the modified steering knuckle steering surface (198—described above and seen in FIG. 2).

Figure 34:
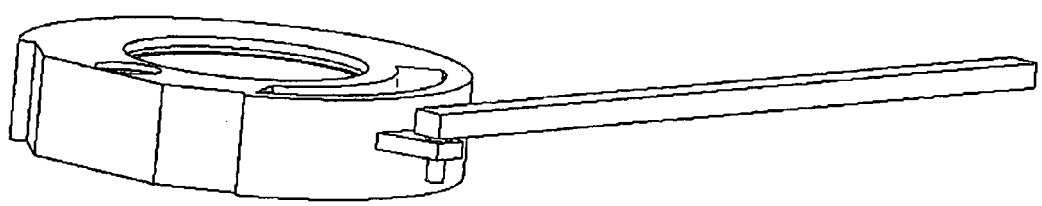
FIG. 34 is a perspective view of the steering follower pulley device with the optional rod-type steering linkage instead of a cable type linkage.
Figure 35:
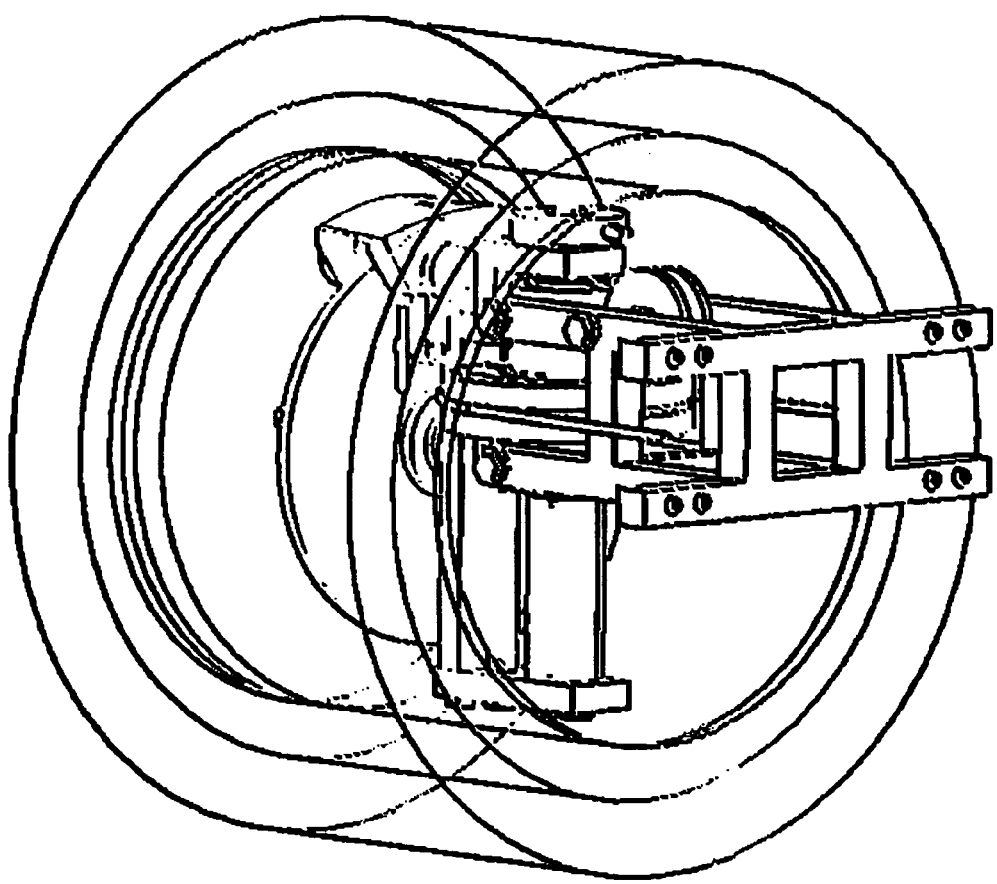
FIG. 35 is a perspective view of the right front wheel-based suspension system under no-load situation (uncompressed).

FIG. 34 shows a variation in which the steering follower pulley device is arranged to accept steering input from a steering rod [as opposed to the preferred embodiment that incorporated a steering cable linkage (110)].

FIGS. 40 and 41 show a variation in which the steering follower pulley device incorporates a contact surface (503) arranged to apply rotational force to the modified steering knuckle (129) via a PTFE or nylon-containing vertical surface (502).

Figure 20:
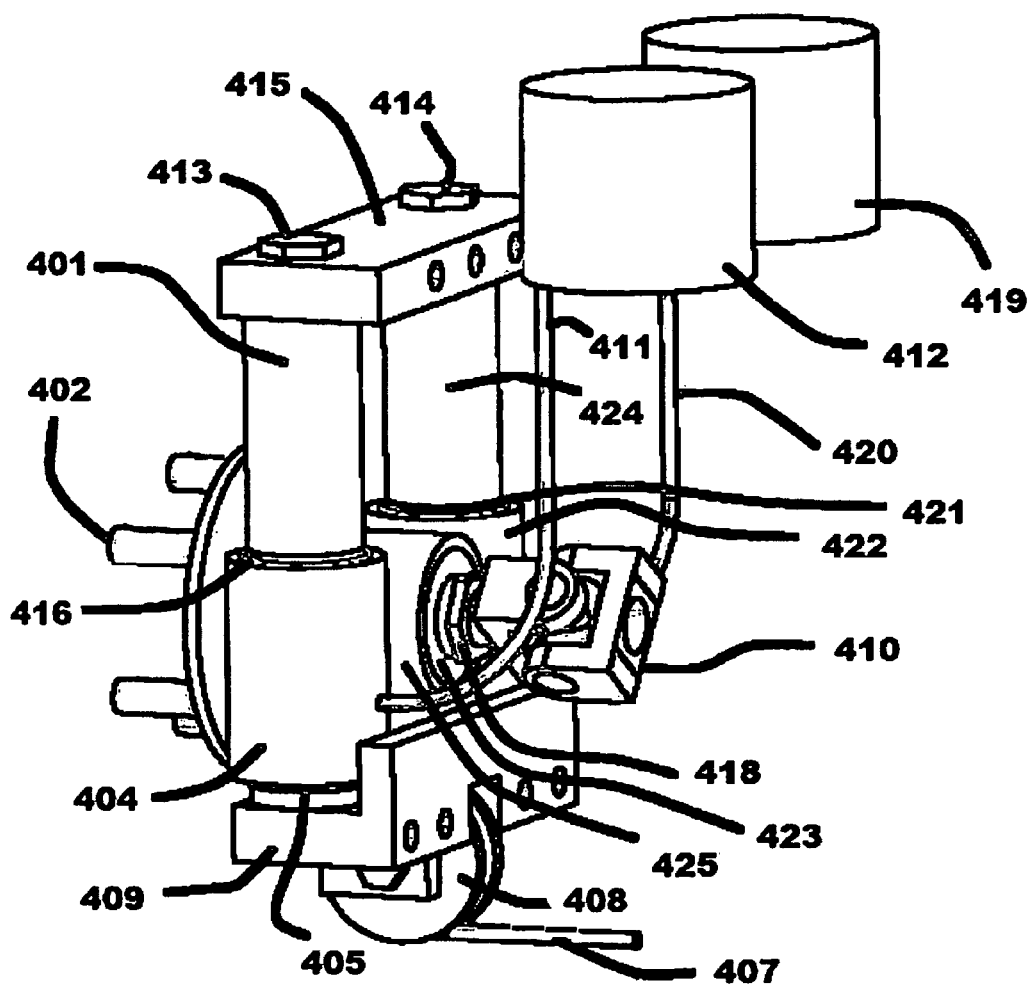
FIG. 20 is a perspective view of the right rear wheel-based suspension system.
Figure 21:
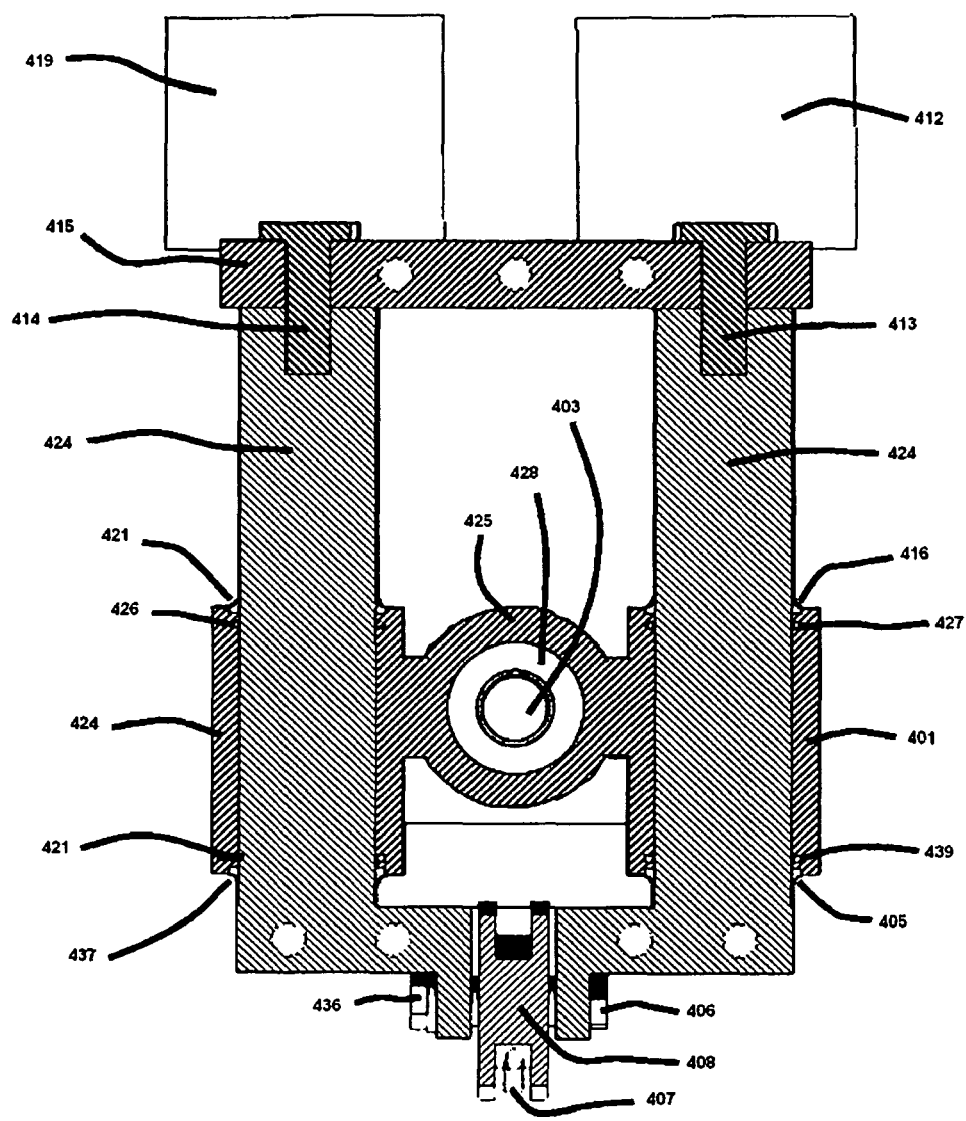
FIG. 21 is a lateral view (viewing from right side of vehicle) of a cutaway section of the right rear wheel-based suspension system.
Figure 22:
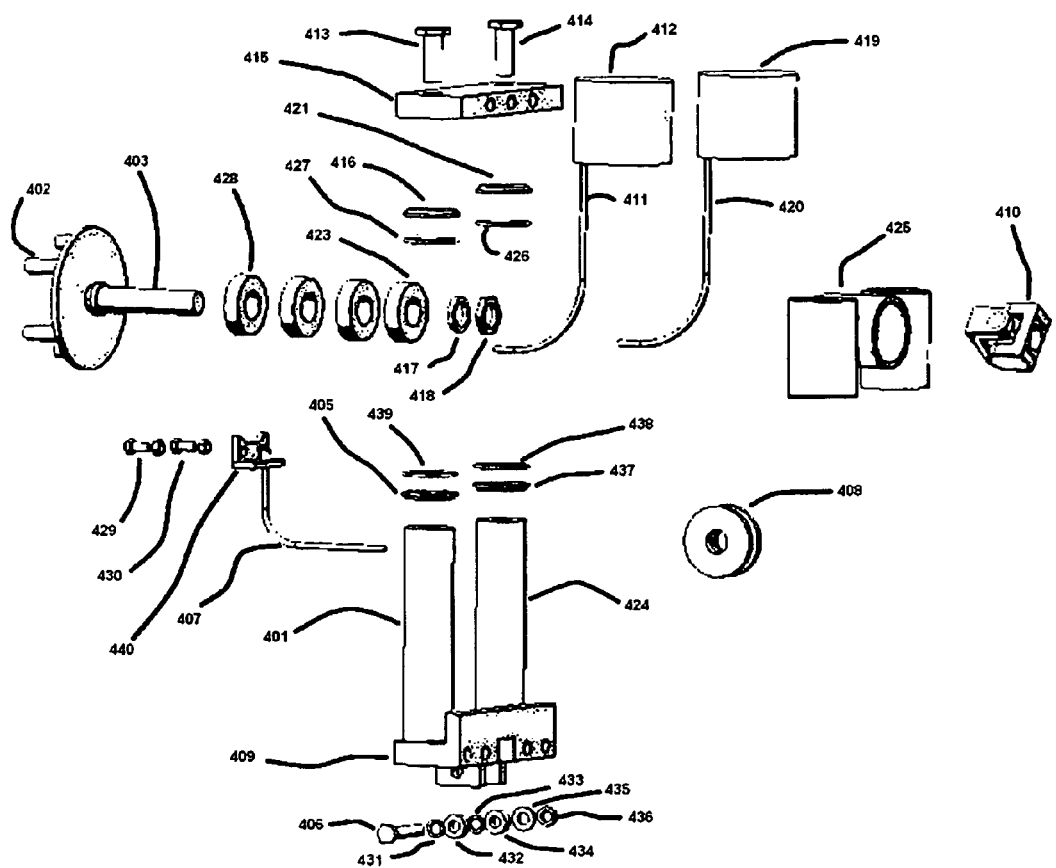
FIG. 22 is an exploded view of the right rear wheel-based suspension system.

Referring to the (right) rear wheel-based components in FIG. 20, the vertical suspension component mounting device (upper portion 415, lower portion 409) attaches firmly to a vehicle structural component (199). The vertical suspension components (401 and 424) provide a low friction contact surface for vertical linear movement of the vertical suspension component housings (404 and 422). The hub (425) is attached firmly to the pair of vertical suspension component housings (404 and 422). The non-dirigible suspension cable linkage (407) attaches to the underside of the hub (425). As the wheel encounters a road bump, the wheel, hub (425) and vertical suspension component housings (404 and 422) move vertically, thus causing tension and displacement of the non-dirigible suspension cable linkage (407). The suspension cable linkage (407) rests in a groove of the pulley (408) which guides the suspension cable linkage toward the energy storage mechanism.

Referring to the energy storage mechanism in FIG. 23, the right suspension cable linkage (106) attaches to a circumferential aspect of the right pulley (310). Displacement of the right suspension cable linkage (106) causes rotation of the right pulley (310) around the axis of its bearing (313). The short segment of the right suspension cable linkage (325)

attaches to a circumferential aspect of the right pulley (310). Displacement of the right suspension cable linkage (106) therefore causes an equidistant displacement of the short segment of the right suspension cable linkage (325). The left suspension cable linkage (306) has a similar relationship to the short segment of the left suspension cable linkage (324) through the left pulley (305) attachment. The right coil spring attachment device (301) is attached to the short segment of the right suspension cable linkage (106) and rests atop the right coil spring (312). Increased tension of the right suspension cable linkage (106) causes displacement of the right coil spring attachment device (301) toward the right coil spring (312), thereby compressing the right coil spring (312). The left coil spring attachment device (302) is attached to the short segment of the left suspension cable linkage (306) and rests atop the left coil spring (303). Increased tension of the left suspension cable linkage (306) causes displacement of the left coil spring attachment device (302) toward the left coil spring (303), thereby compressing the left coil spring (303). The coil spring guide mechanism includes the spring support plate (314), the spring support plate guiding rod (317), the spring support plate guiding rod housing (315) and the spring support plate guiding rod housing mounting bracket (316). Both the right coil spring (312) and left coil spring (303) rest upon the spring support plate (314). Compression of the right coil spring (312) and/or the left coil spring (303) causes pressure to be exerted on the spring support plate (314) and thereby cause the spring support plate (314) to move in the linear direction toward the base spring (307) [as guided by the spring support plate guiding rod (317) and the spring support plate guiding rod housing (315]. Movement of the spring support plate (314) toward the base spring (307) causes compression of the base spring (307) between the spring support plate (314) on one end of the spring and the base spring mounting structure (308) on the other. If tension in the right suspension cable linkage (106) happens to be greater than tension in the left suspension cable linkage (306), movement of the spring support plate (314) toward the base spring (307) contributes to a further reduction in tension of the left suspension cable linkage (306). Therefore, displacement of the right coil spring attachment device (301) results in a (reduced magnitude) displacement of the left coil spring attachment device (302) in a parallel direction. Furthermore displacement of the left coil spring attachment device (302) would result in a displacement (reduced magnitude) of the right coil spring attachment device (301) in a parallel direction. Since displacement of the right coil spring attachment device (301) corresponds to right suspension travel via connections to the right suspension cable linkage (106), and displacement of the left coil spring attachment device (302) corresponds to left suspension travel via connections of the left suspension cable linkage (306), the tendency of the right coil spring attachment device (301) to move in a parallel direction with the left coil spring attachment device (302) produces anti-roll properties in the vehicle suspension system. Under most circumstances, the spring rate of the right coil spring (312) would be equal to the spring rate of the left coil spring (303). If the spring rates of the right coil spring (312) and left coil spring (303) were to be increased relative to the spring rate of the base spring (307), a greater anti-roll effect would be obtained. Conversely, reducing the spring rates of the right coil spring (312) and left coil spring (303) relative to the spring rate of the base spring (307) would lessen the anti-roll effect of the energy storage mechanism. Damping is provided by the right shock absorber (311) and left shock absorber (304), both of which are compressed in response to displacement of the corresponding (right or left) suspension cable linkage (106 and 306 respectively).

Figure 27:
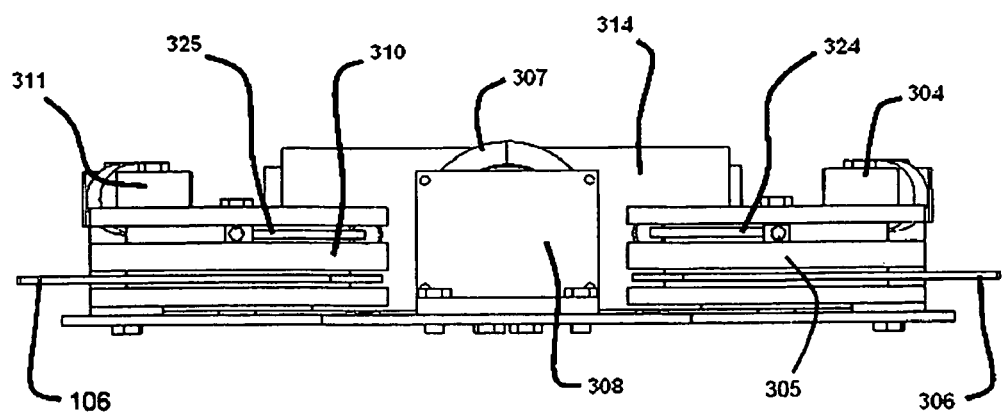
FIG. 27 is a bottom view of the energy storage mechanism.

Referring to FIG. 27, the short segment of the right suspension cable linkage (325) is seen attaching to a circumferential aspect of the right pulley (310). The short segment of the left suspension assembly (324) is seen attaching to a circumferential aspect of the left pulley (305). Not visible is the circumferential connection of the right suspension cable linkage (106) to the right pulley (310). Also not visible is the circumferential connection of the left suspension cable linkage (306) to the left pulley (305).

Figure 28:
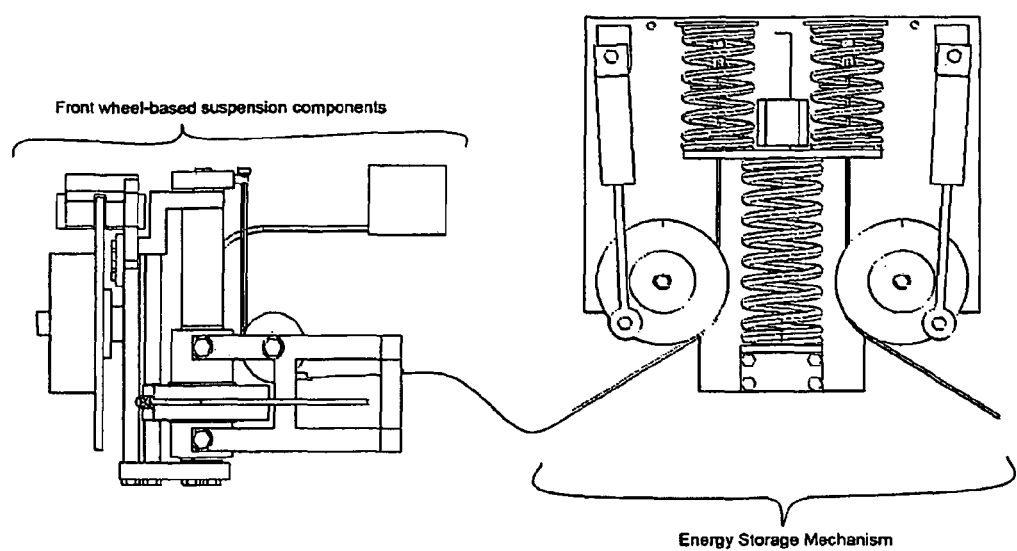
FIG. 28 is a view of the cable connection between the right wheel-based suspension and the energy storage mechanism.
Figure 29:
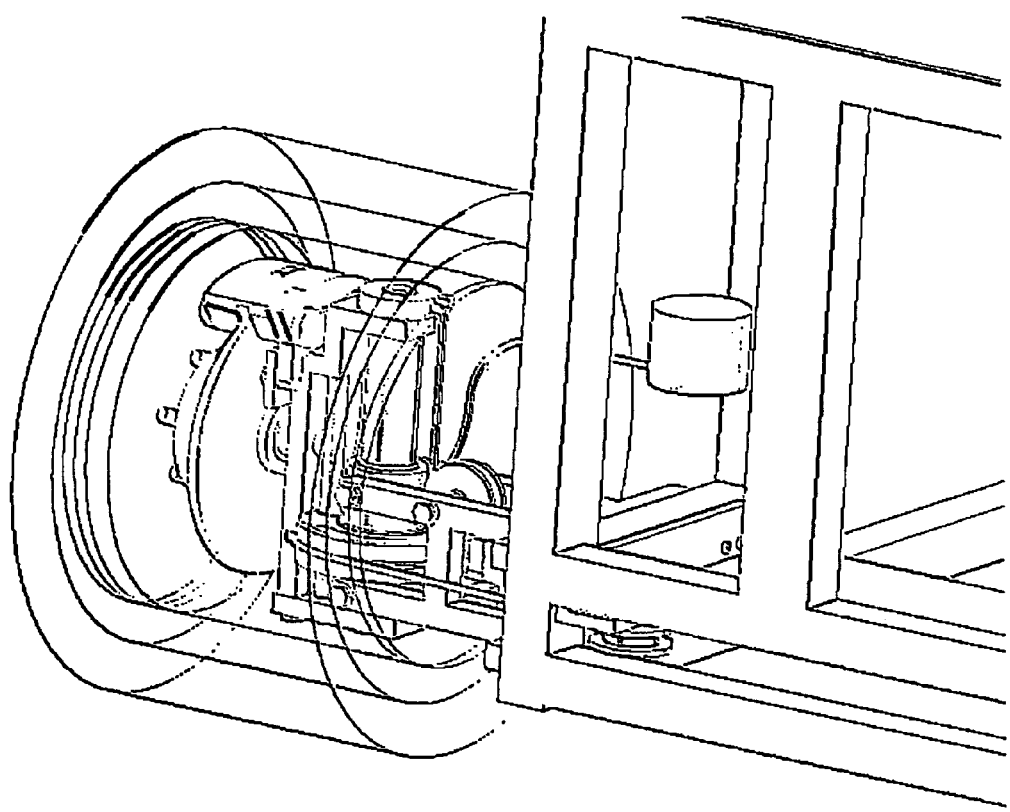
FIG. 29 is a perspective view of the right front wheel-based suspension system mounted on the vehicle structural component.
Figure 30:
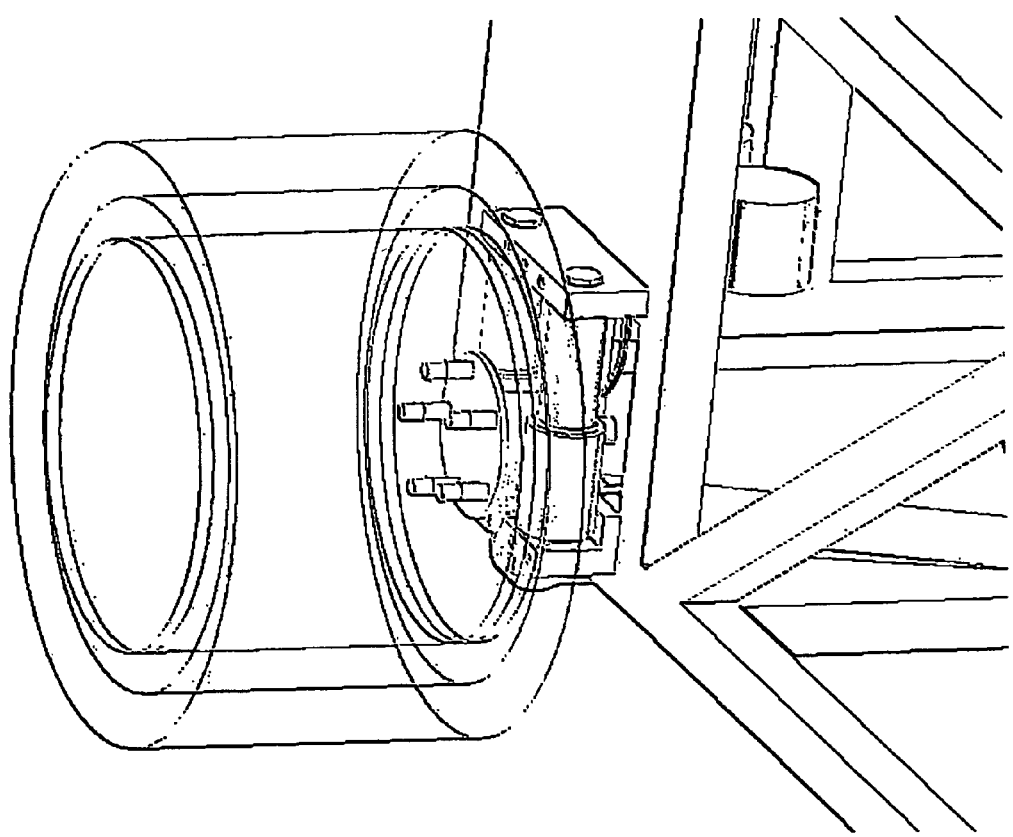
FIG. 30 is a perspective view of the right rear wheel-based suspension system mounted on the vehicle structural component.

Referring to FIG. 28, the suspension cable linkage is shown interconnecting the right front wheel-based components to the energy storage mechanism.

Figure 18:
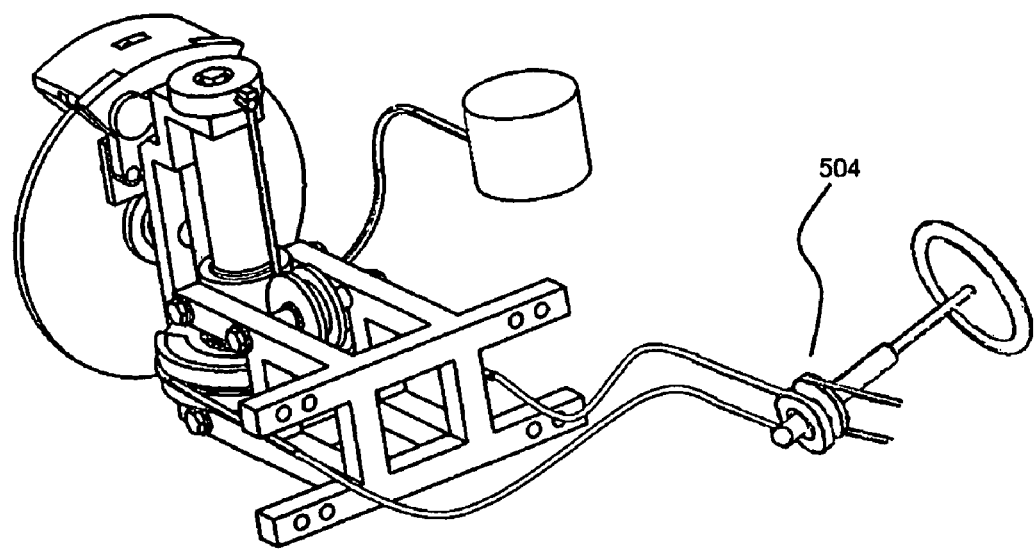
FIG. 18 is a view of the cable connection between the steering shaft pulley and the wheel-based steering follower pulley device.
Figure 19:
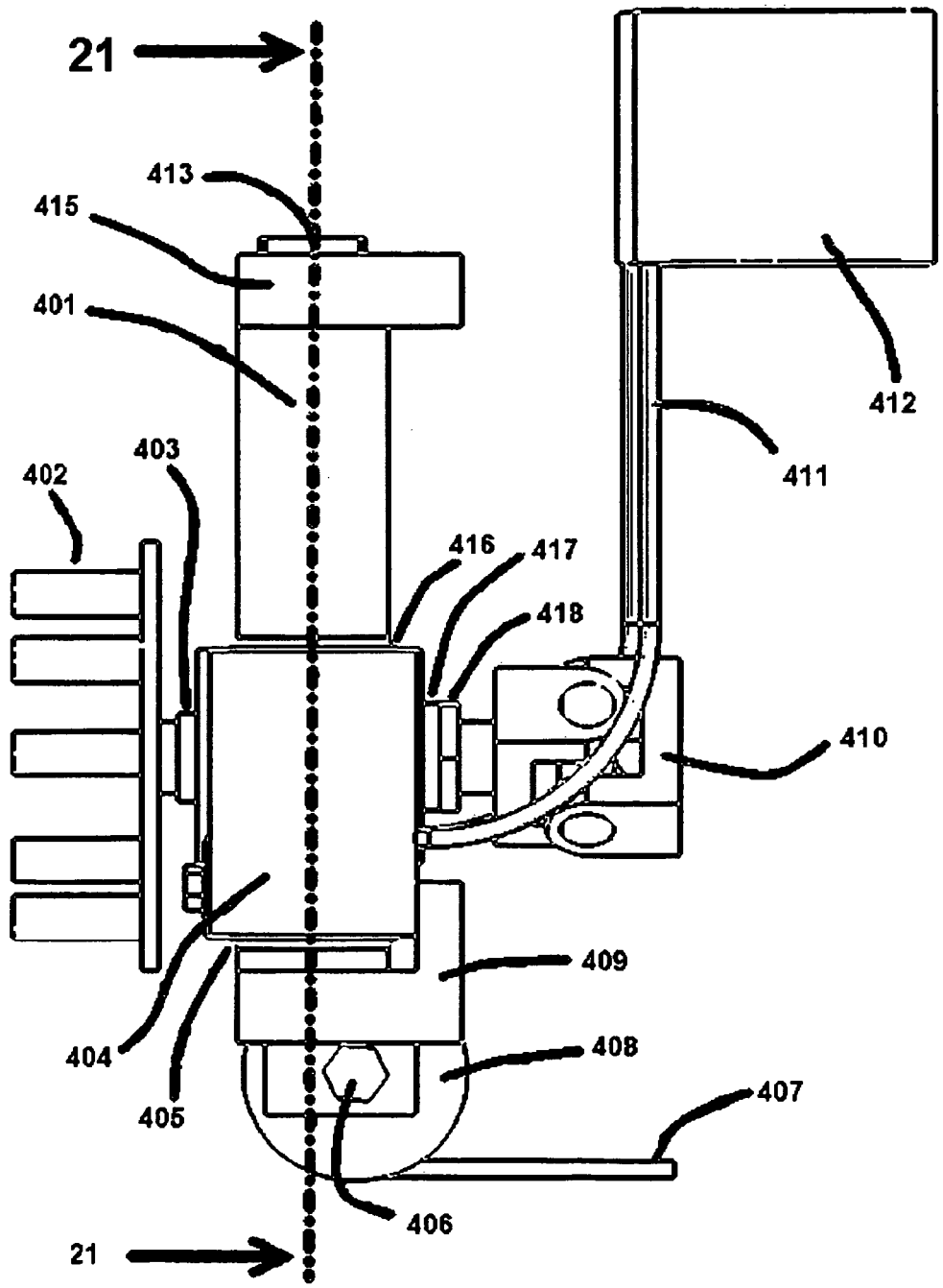
FIG. 19 is a frontal view of the right rear wheel-based suspension system. Section line for drawing in FIG. 21 is shown.

Referring to FIG. 18, the steering cable linkage is shown interconnecting the right front wheel-based components to the steering wheel driving pulley mechanism (504).

Referring to FIG. 39, a (cam-shaped) modified steering wheel driving pulley mechanism (505) is shown. The cam provides increased displacement of the left steering cable linkage (as compared to the right steering cable linkage) during left-hand turns (and vice-versa with increased displacement of the right steering cable linkage as compared to left steering cable linkage during right-hand turns) in order to provide for proper Ackerman angles during vehicle turns.

PARTS LIST FOR DRAWINGS

101. Brake caliper, front, right
102. Modified steering knuckle, upper knuckle portion
103. Bolt, suspension cable attachment mechanism
104. Bearing cap, suspension cable attachment mechanism.
105. Cable stop
106. Right suspension cable linkage
107. Oil tube
108. Oil reservoir
109. Cylindrical suspension component housing, right
110. Wiper seal, upper, for cylindrical suspension component housing, right front wheel
111. Cylindrical suspension component
112. Bolt, subframe to cylindrical suspension component housing, right front wheel, upper-anterior
113. Pulley, for redirection of cable during transfer of vertical suspension movement
114. Bolt—subframe to pulley, right front wheel, front upper
115. Washer—subframe to pulley, right front wheel, front
116. Subframe assembly, right front wheel
118. Steering cable linkage, right front wheel, front portion
119. Steering follower pulley device, right front wheel
120. Washer, subframe to cylindrical suspension component housing, right front wheel, front
121. Bolt, subframe to cylindrical suspension component housing, right front wheel, front
122. Wiper seal lower, for cylindrical suspension component housing, right front wheel
123. Modified steering knuckle lower end cap
124. Bolt
125. Bolt
126. Bolt
127. Bolt
128. Contact surface of steering follower pulley device.
129. Modified steering knuckle, support column
130. Bolt, steering cable linkage to steering follower pulley device, front
131. Brake disc, right front wheel
132. Hub, right front wheel 133. Spacer, spindle bearing
134. Wheel spindle
135. Brake caliper bracket
136. Bolt, brake caliper bracket, upper, right front wheel
137. Washer, subframe to cylindrical suspension component housing, right front wheel, front upper
138. Washer, subframe to cylindrical suspension component housing, right front wheel, rear upper
139. Bolt, subframe to cylindrical suspension component housing, right front wheel, rear upper
140. Steering cable linkage, rear portion
141. Nut—subframe to pulley, right front wheel, rear
142. Washer, subframe to pulley, right front wheel, rear
143. Spacer, rear, subframe to pulley bearing
144. Spacer, front, subframe to pulley bearing
145. Oil reservoir cap, steering pulley reservoir
146. Bolt, caliper bracket, posterior
147. Bolt, caliper bracket, lower
148. Bolt, caliper bracket, anterior
149. Washer, upper, suspension cable attachment mechanism
150. Bearing, suspension cable attachment mechanism
151. Washer, lower, suspension cable attachment mechanism
152. Retaining clip, inner, to upper cylindrical suspension component housing groove, mates with upper bearing spacer
153. Spacer, mates to retaining clip on upper side, mates to inner bearing race on lower side
154. Retaining clip, outer, mates to upper surface of outer bearing race, rests in upper steering follower pulley device groove
155. Bearing, allows for steering follower pulley device pivoting movement
156. Retaining clip, outer, mates to lower surface of outer bearing race, rests in lower steering follower pulley device groove.
157. Retaining clip, inner, mates to lower surface of lower bearing spacer, rests in lower outer steering follower pulley device groove
158. O-ring seal, upper, rests in inner upper o-ring steering follower pulley device groove
159. O-ring seal, lower, rests in inner lower o-ring steering follower pulley device groove
160. Spacer, mates to retaining clip on lower side, mates to inner bearing race on upper side
161. Wiper seal, lower, rests in secondary (smaller) steering follower pulley device bore
162. O-ring, lower, rests in lower o-ring groove of secondary (smaller) steering follower pulley device bore
163. Bearing, posterior, rests inside of pulley bore
164. Bearing, anterior, rests inside of pulley bore
165. O-ring seal, upper, rests in upper o-ring groove of secondary (smaller) steering follower pulley device bore
166. Wiper seal, upper, rests in secondary (smaller) steering follower pulley device bore
167. Wheel bearing, outer
168. Wheel bearing, inner
169. Washer, subframe to cylindrical suspension component housing, rear, lower
170. Bolt, lower modified steering knuckle end cap, connects lower modified steering knuckle end cap to main cylindrical suspension component, medial
171. Cable attachment pin, suspension cable attachment mechanism.
172. Bolt, subframe to cylindrical suspension component housing, rear lower
174. Bolt, rear, steering cable linkage
175. Bolt, lower modified steering knuckle end cap, connects lower modified steering knuckle end cap to main modified steering knuckle cylindrical suspension component, lateral
176. Bolt, lower modified steering knuckle end cap, connects lower modified steering knuckle end cap to secondary modified steering knuckle rod
177. Bolt, lower modified steering knuckle end cap, posterior, connects lower modified steering knuckle end cap to modified steering knuckle spindle support
178. Oil reservoir for steering follower pulley device
179. Secondary (smaller) bore of steering follower pulley device
180. Primary bore (larger) of steering follower pulley device
181. Threaded hole for front steering cable linkage attachment
182. Groove for front steering cable linkage
183. Oil hole for secondary bore
184. Groove for upper wiper seal, secondary bore, steering follower pulley device
185. Groove for upper o-ring, secondary bore, steering follower pulley device
187. Threaded hole for rear steering cable linkage attachment
188. Groove for rear steering cable linkage
189. Threaded hole, lower front, for bolt that attaches subframe to cylindrical suspension component housing
190. Threaded hole, upper front, for bolt that attaches subframe to cylindrical suspension component housing
191. Retaining clip groove, upper
192. Retaining clip groove, lower
193. Threaded hole, lower rear, for bolt that attaches subframe to cylindrical suspension component housing
194. Oil hole, feeds oil from external reservoir to inner cylindrical suspension component housing surface
195. Threaded hole, upper rear, for bolt that attaches subframe to cylindrical suspension component housing
196. Upper wiper seal groove, cylindrical suspension component housing
197. Upper o-ring groove, cylindrical suspension component housing
198. Modified steering knuckle steering surface.
199. Vehicle structural component (frame of vehicle).
201. Rotational axis of cylindrical suspension component and steering follower pulley device.
301. Right coil spring attachment device
302. Left coil spring attachment device
303. Left coil spring
304. Shock, left.
305. Pulley, left
306. Left suspension cable linkage—attaches pulley to bearing cap of left suspension cable attachment mechanism
307. Base spring
308. Base spring mounting structure
310. Pulley, right
311. Shock absorber, right
312. Right coil spring
313. Bearing for right pulley
314. Spring support plate
315. Spring support plate guiding rod housing
316. Spring support plate guiding rod housing mounting bracket
317. Spring support plate guiding rod
318. Mounting plate
319. Washer for bearing bolt of spring assembly
320. Bolt
321. Bolt for lower shock absorber, left
322. Bolts
323. Spacer block, left, for upper end of shock absorber 324. Short segment of left suspension cable linkage
325. Short segment of right suspension cable linkage
326. Bolts—for attachment of U-bracket to mounting plate
327. Bearing for left pulley
328. Spacer block, right, for upper end of shock absorber
329. Bolts
330. Bolts, u-bracket, right side
331. Bolt, for lower shock absorber, right
332. Bolts
401. Vertical suspension structure, anterior, right rear suspension assembly
402. Wheel studs, right rear wheel
403. Wheel spindle
404. Vertical suspension structure housing, anterior, right wheel
405. Wiper seal, lower, anterior vertical suspension structure housing
406. Bolt, mounts pulley to underside of suspension
407. Non-dirigible suspension cable linkage, attaches to underside of hub
408. Pulley, for cable
409. Vertical suspension structure mounting device (lower portion)
410. Universal joint
411. Oil tube, anterior
412. Oil reservoir, anterior
413. Bolt, anterior
414. Bolt, posterior
415. Vertical suspension structure mounting device, upper portion
416. Wiper seal, upper, anterior vertical suspension structure housing
417. Spindle washer
418. Spindle nut
419. Oil reservoir, posterior
420. Oil tube, posterior
421. Wiper seal, upper, posterior vertical suspension structure housing
422. Vertical suspension structure housing, posterior, right rear wheel
423. Bearing, medial
424. Vertical suspension structure, posterior; right rear wheel
425. Hub
426. O-ring, upper, posterior vertical suspension structure housing
427. O-ring, upper, anterior vertical suspension structure housing
428. Bearing, outer
429. Bolt, cable bracket, anterior
430. Bolt, cable bracket, posterior
431. Washer, anterior, for pulley bolt
432. Bearing, pulley, anterior
433. Washer, middle, used as spacer between bearings
434. Bearing, pulley, posterior
435. Washer, pulley, posterior
436. Nut, for pulley bolt
437. Wiper seal, lower, posterior vertical suspension structure housing
438. O-ring, lower, posterior vertical suspension structure housing
439. O-ring, lower, anterior vertical suspension structure housing
440. Cable attachment plate
501. Small wheals mounted on bearings which contact anterior and posterior vertical surfaces of modified steering knuckle spindle support.
502. Vertical surface of modified steering knuckle where a PTFE or nylon lubricating strip can be applied.
503. Vertical surface of steering follower pulley device where a PTFE or nylon lubricating strip can be applied.
504. Steering wheel driving pulley mechanism.
505. Cam-shaped modified steering wheel driving pulley mechanism.

The invention claimed is:

1. A suspension and steering system for dirigible wheel(s) of a wheeled vehicle comprising a cylindrical suspension component arranged for linear oscillatory motion in response to vertically oriented wheel travel and arranged for rotation around its longitudinal axis in response to driver steering input applied thereto, a cylindrical suspension component housing arranged to guide said cylindrical suspension component, a modified steering knuckle arranged to attach said cylindrical suspension component to a corresponding wheel hub, a suspension cable attachment mechanism arranged to maintain alignment of a suspension cable linkage with a corresponding pulley, an energy storage mechanism arranged to absorb energy resulting from said vertically oriented wheel travel, said suspension cable linkage operatively interconnecting said suspension cable attachment mechanism and said energy storage mechanism, a steering wheel driving pulley mechanism (504) operable in response to driver steering effort applied thereto to steer the dirigible road wheel(s), a steering cable linkage and a steering follower pulley device arranged to rotate around the longitudinal axis of said cylindrical suspension component, wherein said cylindrical suspension component housing is attached via an attachment mechanism to a vehicle structural component, movement of said cylindrical suspension component in a direction perpendicular to its longitudinal axis with respect to said cylindrical suspension component housing is prevented by the said cylindrical suspension component housing which acts as a guide for said cylindrical suspension component, rotation of said cylindrical suspension component around its longitudinal axis and with respect to said cylindrical suspension component housing is possible due to the arrangement of a cylindrical outer contour of the cylindrical suspension component and a cylindrical inner contour of the cylindrical suspension component housing bore thus providing mutual contact surfaces, said cylindrical suspension component is configured to oscillate in a linear direction of its longitudinal axis with respect to said cylindrical suspension component housing in response to said vertically oriented wheel travel, said cylindrical suspension component is configured to rotate around its longitudinal axis during vehicle turns, said suspension cable attachment mechanism is arranged to transfer displacement resulting from oscillation of said cylindrical suspension component to said suspension cable linkage, said energy storage mechanism is arranged to attach to said suspension cable linkage and arranged to store energy resulting from said vertically oriented wheel travel, an attachment arrangement between said steering follower pulley device and said cylindrical suspension component housing allows for rotation of said steering follower pulley device around the longitudinal axis of said cylindrical suspension component housing while preventing displacement of said steering follower pulley device along the longitudinal axis of said cylindrical suspension component, said steering follower pulley device is arranged to convert displacement of said steering cable linkage into rotational motion and transfer said rotational motion into rotational motion of said modified steering knuckle thereby causing said modified steering knuckle to rotate in concert with said steering follower pulley device.

2. A suspension system for non-dirigible wheels of a wheeled vehicle comprising a pair of vertical suspension structures, a vertical suspension structure mounting device, a pair of vertical suspension structure housings, a non-dirigible suspension cable linkage and a wheel hub
wherein said vertical suspension structure mounting device is attached to a vehicle structural component and remains fixed thereto, the said vertical suspension structures are rigidly attached to said vertical suspension structure mounting device, the pair of said vertical suspension structures are arranged to provide an outer lubricated contact surface, the pair of vertical suspension structure housings are arranged to provide an inner surface for contact with said pair of vertical suspension structures, said pair of vertical suspension structure housings are arranged to oscillate vertically during road bumps in the linear direction guided by a outer contact surface of the vertical suspension structures and said inner contact surface of the vertical suspension structure housings, said pair of vertical suspension component structure housings are arranged to act as a structure for rigid attachment of said wheel hub.

3. An energy storage mechanism for a pair of wheel-based suspension systems as described in claim 1, comprising a right coil spring, a left coil spring, a right coil spring attachment device arranged for attaching the corresponding right said cable linkage to one end of said right coil spring, a left coil spring cable attachment device arranged for attaching left said suspension cable linkage to the said left coil spring, a coil spring guide mechanism arranged to support and guide both said right coil spring and said left coil spring in a direction parallel with each other and in a linear direction parallel to the longitudinal axis of both the said right coil spring and said left coil spring, a base spring arranged to convert linear displacement of said coil spring guide mechanism into stored energy, a mounting plate arranged to be rigidly attached to a vehicle structural component and arranged to remain stationary and arranged to accept attachments from a base spring attachment device and arranged to accept mounting attachments of said coil spring guide mechanism,
wherein said left coil spring and said right coil spring are arranged in a manner that allows for compressive forces of said right coil spring to be directed parallel to compressive forces of said left coil spring, said compressive force from said right coil spring is exerted in a direction parallel to said compressive force of said left coil spring, said compressive force of said right coil spring and said compressive force of said left coil spring are both exerted in a parallel direction onto said coil spring guide mechanism, said common coil spring guide mechanism travels in a parallel direction to the displacement of said right coil spring and displacement of said left coil spring, said common coil spring guide mechanism receives forces via contact from both said left coil spring and said right coil spring and acts to guide these forces into a linear direction towards and onto the base spring, one end of said base spring receives pressures exerted from said coil spring guide mechanism and moves in concert with said coil spring guide mechanism while the opposing end of the said base spring remains fixed with respect to a mounting structure.

4. An arrangement in claim 1, wherein said steering follower pulley device incorporates a cylindrical secondary bore which has a longitudinal axis parallel to the longitudinal axis of said cylindrical suspension component but at a distance lateral to said longitudinal axis of said cylindrical suspension component, a lubricated contact surface exists between the inner surface of said cylindrical secondary bore of said steering follower pulley device and a cylindrical outer surface of a vertically oriented cylindrical steering rod of said modified steering knuckle, said lubricated contact surface of said vertically oriented cylindrical steering rod of said modified steering knuckle receives rotational forces from said steering follower pulley device and translates said forces into rotational movement of said modified steering knuckle, and said steering follower pulley device maintains a fixed vertical position with respect to said cylindrical suspension component housing via an attachment thereto.

5. An arrangement in claim 1, wherein said steering follower pulley device transmits its rotational motion onto said modified steering knuckle via an arrangement between a contact surface of said steering follower pulley device and a planar surface of said modified steering knuckle, said contact surface of said steering follower pulley device contacts said planar surface of said modified steering knuckle, said planar surface of said modified steering knuckle moves in a direction parallel to the longitudinal axis of said cylindrical suspension component during vertically oriented wheel travel and acts as a contact surface to receive rotational forces from a contact surface of said steering follower pulley device, forces transferred from said contact surface of said steering follower pulley device onto said planar surface of said cylindrical suspension component spindle attachment allow the transfer of rotational motion from said steering follower pulley device to said modified steering knuckle during vehicle turns, and a lubricating block is used on either the said contact surface of said steering follower pulley device and/or on said planar surface of said cylindrical suspension component spindle attachment to allow for lubrication.

6. An arrangement in claim 1, wherein both said steering cable linkage and said steering follower pulley device are replaced by a tie rod and tie rod-driven steering follower pulley device, said tie rod-driven steering follower pulley device incorporates a tie rod linkage attachment mechanism whereby a steering tie rod attaches to said tie-rod driven steering follower pulley device in a manner so as to create a moment arm, a tie rod linkage replaces said steering cable linkage, displacement of said tie rod linkage in response to driver steering input applied thereto is converted to rotational movement of said rod-driven steering follower pulley device around the longitudinal axis of said cylindrical suspension component, and said rod-driven steering follower pulley device transfers its rotational movement to said modified steering knuckle thereby causing said modified steering knuckle to rotate in concert with said rod-driven steering follower pulley device during vehicle turns.

* * * * *